US010397276B2

(12) United States Patent
Li et al.

(10) Patent No.: US 10,397,276 B2
(45) Date of Patent: Aug. 27, 2019

(54) SECURE ELEMENT MANAGEMENT METHOD AND TERMINAL

(71) Applicant: HUAWEI DEVICE CO., LTD., Dongguan (CN)

(72) Inventors: Guoqing Li, Beijing (CN); Xinmiao Chang, Beijing (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 136 days.

(21) Appl. No.: 15/129,715

(22) PCT Filed: Apr. 1, 2014

(86) PCT No.: PCT/CN2014/074553
§ 371 (c)(1),
(2) Date: Sep. 27, 2016

(87) PCT Pub. No.: WO2015/149285
PCT Pub. Date: Oct. 8, 2015

(65) Prior Publication Data
US 2017/0142159 A1 May 18, 2017

(51) Int. Cl.
*H04L 29/06* (2006.01)
*H04L 12/24* (2006.01)
(Continued)

(52) U.S. Cl.
CPC ......... *H04L 63/20* (2013.01); *G06Q 20/3227* (2013.01); *H04B 5/0031* (2013.01);
(Continued)

(58) Field of Classification Search
CPC ...... H04L 63/20; H04L 63/0492; H04W 4/80; H04W 4/008; H04W 12/08; G06Q 20/3227; H04B 5/0031
See application file for complete search history.

(56) References Cited

U.S. PATENT DOCUMENTS 8,712,407 B1 * 4/2014 Cope .................. H04W 4/00
455/426.1
2009/0119516 A1 5/2009 Tanabiki et al.
(Continued)

FOREIGN PATENT DOCUMENTS

CN 102325210 A 1/2012
CN 102934121 A 2/2013
(Continued)

OTHER PUBLICATIONS

Nosheen et al., Handling Multiple SIMs—A Framework Based on Software Restructuring Approach, 2011 Third International Conference on Communications and Mobile Computing, 2011, pp. 178-181 (Year: 2011).*
(Continued)

*Primary Examiner* — Luu T Pham
*Assistant Examiner* — Harvey I Cohen
(74) *Attorney, Agent, or Firm* — Oblon, McClelland, Maier & Neustadt, L.L.P.

(57) ABSTRACT

Embodiments of the present invention provide a secure element management method and a terminal. The method includes: when a first secure element is connected to a secure element interface, acquiring identification information of the connected first secure element; acquiring preset identification information, where the preset identification information is used to identify an exclusive secure element; matching the identification information of the first secure element with the preset identification information; and when the identification information of the first secure element matches the preset identification information, setting the first secure element to a normal working state, and setting connected other secure elements on the terminal to a non-normal working state. According to the embodiments of the present invention, the terminal supports a management mode of an exclusive
(Continued)

secure element, a requirement of an exclusive secure element issuer for taking control of a secure element of the terminal is met.

14 Claims, 16 Drawing Sheets

(51) Int. Cl.
  *H04W 4/80* (2018.01)
  *G06Q 20/32* (2012.01)
  *H04B 5/00* (2006.01)
  *H04W 12/08* (2009.01)

(52) U.S. Cl.
  CPC .......... *H04L 41/00* (2013.01); *H04L 63/0492* (2013.01); *H04W 4/80* (2018.02); *H04W 12/08* (2013.01)

(56) References Cited

U.S. PATENT DOCUMENTS

| | | | | |
|---|---|---|---|---|
| 2010/0317403 A1* | 12/2010 | Mizuo | ................... | H04W 48/16 455/558 |
| 2012/0298760 A1* | 11/2012 | Li | ...................... | G06K 7/10237 235/492 |
| 2013/0042321 A1 | 2/2013 | Wang et al. | | |
| 2013/0109436 A1* | 5/2013 | Tat | ........................ | H04W 8/183 455/558 |
| 2013/0217323 A1* | 8/2013 | Bhatia | .................. | H04B 5/0031 455/41.1 |
| 2013/0225073 A1 | 8/2013 | O'Donoghue et al. | | |
| 2013/0237197 A1* | 9/2013 | Ruvalcaba | ............ | H04W 8/183 455/418 |
| 2013/0299596 A1* | 11/2013 | Choi | ................... | G06Q 20/227 235/492 |
| 2013/0329639 A1* | 12/2013 | Wietfeldt | .............. | H04W 88/06 370/328 |
| 2014/0024353 A1* | 1/2014 | Baek | ...................... | H04W 4/16 455/417 |
| 2014/0035727 A1 | 2/2014 | Nguyen | | |
| 2014/0155118 A1* | 6/2014 | Tsuda | ................... | H04W 88/06 455/522 |

FOREIGN PATENT DOCUMENTS

| | | |
|---|---|---|
| CN | 103222291 A | 7/2013 |
| CN | 103441878 A | 12/2013 |
| EP | 2 667 650 A1 | 11/2013 |
| JP | 2011186770 A | 9/2011 |
| JP | 2013187720 A | 9/2013 |
| WO | 2016168989 A1 | 10/2016 |
| WO | 2016172948 A1 | 11/2016 |
| WO | 2017166135 A1 | 10/2017 |

OTHER PUBLICATIONS

Murtaza et al., Stochastic Optimal SIM Selection for Multi-SIM Cell-Phone Architecture Using Semi-Markov Decision Processes, 2012 IEEE Vehicular Technology Conference (VTC Fall), 2012, pp. 1-5 (Year: 2012).*

Li et al., Development of mobile phone using dual-interface SIM, IEEE/ACES International Conference on Wireless Communications and Applied Computational Electromagnetics, 2005, pp. 956-959 (Year: 2005).*

Office Action dated Feb. 6, 2018 in Japanese Patent Application No. 2016-558643 (with partial English translation).

International Search Report dated Jan. 8, 2015, in PCT/CN2014/074553 filed Apr. 1, 2014.

Combined Chinese Office Action and Search Report dated May 19, 2017 in Patent Application No. 201480001345.7 (with English translation of Categories of Cited Documents).

Extended European Search Report dated Dec. 8, 2016 in Patent Application No. 14888094.1.

"GlobalPlatform Mobile Task Force Requirements for NFC Mobile: Management of Multiple Secure Elements" Retrieved from the Internet: URL:http://www.globalplatform.org/documents/whitepapers/GlobalPlatform_Requirements_Secure_Elements.pdf, XP002714682, Feb. 1, 2010, pp. 1-15.

"Identification Cards—Identification of Issuers—Part 1: Numbering System" International Standard, ISO/IEC 7812-1 Third Edition, Oct. 15, 2006, 12 Pages.

"Identification Cards—Integrated Circuit Cards—Part 3: Cards with Contacts—Electrical Interface and Transmission Protocols" International Standard, ISO/IEC 7816-3 Third Edition, Nov. 1, 2006; 57 Pages.

"Identification Cards—Integrated Circuit Cards—Part 4: Organization, Security and Commands for Interchange" International Standard, ISO/IEC 7816-4 Third Edition, Jan. 15, 2005, 90 Pages.

Japanese Office Action dated Dec. 12, 2017 in Japanese Patent Application No. 2016-558643 (with English translation).

* cited by examiner

SECURE ELEMENT MANAGEMENT METHOD AND TERMINAL

CROSS-REFERENCE TO RELATED APPLICATIONS

This application is a National Stage of International Application No. PCT/CN2014/074553, filed on Apr. 1, 2014, which is hereby incorporated by reference in its entirety.

TECHNICAL FIELD

The present disclosure relates to the field of mobile payment, and in particular, to a secure element management method and a terminal.

BACKGROUND

With rapid development of mobile communications electronic technologies, especially fast development of smart phone technologies, smart phones are already gradually popularized. Meanwhile, existing various business models also put forwards a new requirement for a quick, convenient, and secure mode of payment. Under this general background, to meet an increasingly diverse, convenient, and secure payment requirement, near field communication (NFC) has become a technology supported by a growing number of mobile terminals.

An existing NFC mobile payment system mainly includes three categories of entities: The first one is a terminal central processing unit (terminal CPU, also referred to as device host), which is responsible for configuring and managing an NFC controller, for example, configuring a radio frequency communication parameter for the NFC controller, and configuring a routing table of the NFC controller, so that the NFC controller can cooperate with a secure element to implement near field communication or a payment transaction; the second one is the NFC controller, which is configured to receive configurations such as a communication parameter and a routing table that are configured by the terminal CPU, and send, according to these configurations and by using an antenna, data sent by the terminal CPU and an SE (Secure Element, secure element) to a remote NFC entity; the third one is the secure element, which is configured to store related data of an NFC application and provide a secure and confidential environment. In an existing mobile payment industry, a secure element may be controlled by a mobile communications operator, a financial institution, or a third-party mobile payment operator. Meanwhile, there may multiple secure elements on one terminal, and participants all demand that multiple secure elements work simultaneously; on the other hand, the mobile communications operator, to protect its own interests, proposes an appeal for an exclusive secure element (XSE), and proposes that after an exclusive secure element is embedded into a mobile phone, only an application installed on the exclusive secure element is allowed to run in a terminal environment, and expects to take control of the secure elements on the terminal.

As shown in FIG. 1, the prior art provides a mobile payment terminal that includes an application program module, an NFC module, a multipath switching switch module, and a multi-secure element module. After the mobile payment terminal is powered on, connections between the NFC module and secure element chips are successively switched by using the multipath switching switch module to obtain an enumerated queue of the secure element chips, an application program list supported by the secure element chips, and a correspondence between each secure element chip and an application program; a user selects an application program from the application program list and runs the application program, sends a gating control signal of a corresponding secure element chip according to the correspondence between each secure element chip and an application program, and establishes a data transmission link between the NFC module and the corresponding secure element chip. In this way, it is implemented that the NFC controller is controlled to connect to different secure element chips according to different application programs. In the prior art, essentially, a connection between a single secure element and the NFC controller is controlled by using a switch, and a relatively mature technical solution in the industry in which a terminal runs a single secure element to perform payment is still used. Currently, the Global Platform standard organization, to coordinate interests of all parties, is formulating a technical solution in which multiple secure elements work collaboratively. However, if the technical solution in which multiple secure elements work collaboratively is adopted, a situation definitely arises: the multiple secure elements that works collaboratively are in an equal status, and a plan of a secure element issuer (for example, a mobile communications operator) that expects the terminal to run only a secure element issued by the secure element issuer cannot be achieved; therefore, an appeal of secure element issuers cannot be met.

SUMMARY

In view of this, a technical problem to be resolved in embodiments of the present disclosure is how to enable only one secure element, on a terminal that supports collaborative working of multiple secure elements, to be in a normal working state and enable other secure elements to be in a non-normal working state.

According to a first aspect, the present disclosure provides an embodiment of a terminal.

In a first possible implementation manner, the terminal includes: a processor and at least two secure element interfaces, where the processor is connected to the at least two secure element interfaces; and the processor is configured to: when a first secure element is connected to the secure element interfaces, acquire identification information of the connected first secure element; acquire preset identification information, where the preset identification information is used to identify an exclusive secure element; match the identification information of the first secure element with the preset identification information; and when the identification information of the first secure element matches the preset identification information, set the first secure element to a normal working state, and set connected other secure elements on the terminal to a non-normal working state, where the other secure elements are secure elements connected to the secure element interfaces.

With reference to the first possible implementation manner of the first aspect, in a second possible implementation manner, the processor is further configured to set both the first secure element and the other secure elements to the normal working state when the identification information of the first secure element does not match the preset identification information and identification information of the other secure elements does not match the preset identification information.

With reference to the second possible implementation manner of the first aspect, in a third possible implementation manner, the processor is further configured to acquire the identification information of the connected other secure elements; match the identification information of the other secure elements with the preset identification information; and determine that the identification information of the other secure elements does not match the preset identification information.

With reference to the second possible implementation manner of the first aspect, in a fourth possible implementation manner, the terminal further includes a memory; the memory is connected to the processor; the memory stores information about matching between identification information of secure elements connected to the secure element interfaces and the preset identification information; and the processor is further configured to acquire the information that is stored in the memory and about matching between identification information of secure elements connected to the secure element interfaces and the preset identification information, and determine that the identification information of the other secure elements does not match the preset identification information.

With reference to any one of the first to the fourth possible implementation manners of the first aspect, in a fifth possible implementation manner, the identification information acquired by the processor includes owner identification information, where the owner identification information is used to identify a secure element issuer.

With reference to any one of the first to the fifth possible implementation manners of the first aspect, in a sixth possible implementation manner, when it is detected that a quantity of secure elements connected to the at least two secure element interfaces changes, the processor is further configured to disable NFC applications installed on all secure elements connected to the secure element interfaces.

With reference to any one of the first to the sixth possible implementation manners of the first aspect, in a seventh possible implementation manner, the terminal further includes an NFC controller, the NFC controller is connected to the processor, the NFC controller is connected to the secure element interfaces, and the processor is further configured to send an instruction to the NFC controller, and set the first secure element to an enabled state; create a logical channel between the processor and the NFC controller, where the logical channel is used for communication between the processor and the first secure element; and configure routing information of an application installed on the first secure element into a routing table of the NFC controller.

With reference to the seventh possible implementation manner of the first aspect, in an eighth possible implementation manner, the processor is further configured to configure the routing information of the application installed on the first secure element into a routing table maintained by the processor.

With reference to any one of the first to the sixth possible implementation manners of the first aspect, in a ninth possible implementation manner, the terminal further includes a control circuit and an NFC controller; the control circuit is connected to the processor; the control circuit is connected to the NFC controller; the control circuit is connected to the secure element interfaces; a control switch is disposed on the control circuit, where a first end of the control switch is connected to a secure element interface connected to the other secure elements, and a second end of the control switch is connected to the NFC controller; and the processor is further configured to send a control signal to the control circuit to set the control switch to an open state, where the control signal is used to instruct the control circuit to set the control switch that connects the other secure elements and the NFC controller to the open state.

With reference to any one of the first to the sixth possible implementation manners of the first aspect, in a tenth possible implementation manner, the terminal further includes an NFC controller, the NFC controller is connected to the processor, the NFC controller is connected to the secure element interfaces, and that the processor is further configured to perform at least one of the following implementation manners: sending an instruction to the NFC controller to set the other secure elements to a disabled state; or deleting routing information, stored in a routing table of the NFC controller, of an application installed on the other secure elements.

With reference to any one of the first to the tenth possible implementation manners of the first aspect, in an eleventh possible implementation manner, the processor is further configured to send a query message to the first secure element, where the query message is used to query the identification information of the first secure element; and receive an answer message sent by the first secure element, where the answer message includes the identification information of the first secure element.

With reference to any one of the first to the sixth possible implementation manners of the first aspect, in a twelfth possible implementation manner, the terminal further includes an NFC controller, the NFC controller is connected to the processor, the NFC controller is connected to the secure element interfaces, and the processor is further configured to send a query message to the NFC controller, where the query message is used to query the identification information of the first secure element connected to the NFC controller; and receive an answer message sent by the NFC controller, where the answer message includes the identification information of the first secure element.

With reference to any one of the seventh to the tenth possible implementation manners of the first aspect, in a thirteenth possible implementation manner, the processor is further configured to send a query message to the NFC controller, where the query message is used to query the identification information of the first secure element connected to the NFC controller; and receive an answer message sent by the NFC controller, where the answer message includes the identification information of the first secure element.

With reference to any one of the first to the tenth possible implementation manner of the first aspect, in a fourteenth possible implementation manner, the terminal further includes a sender and a receiver; and the secure element interfaces include a universal integrated circuit card (UICC) secure element interface, where the UICC secure element interface is configured to connect to a UICC-type secure element; the processor is further configured to generate a query request, where the query request is used to query identification information of the UICC-type secure element; the sender is configured to send the query request to a server; the receiver is configured to receive an answer message sent by the server, where the answer message includes the identification information of the UICC-type secure element; and the processor is further configured to acquire the answer message, and acquire the identification information of the UICC-type secure element from the answer message.

With reference to any one of the first to the tenth possible implementation manners of the first aspect, in a fifteenth possible implementation manner, the secure element interfaces include a UICC secure element interface, where the UICC secure element interface is configured to connect to a UICC-type secure element; the UICC-type secure element is installed on a UICC; and the processor is further configured to receive an answer to reset (ATR) message sent by the UICC, and acquire identification information of the UICC-type secure element.

With reference to the fourteenth or the fifteenth possible implementation manner of the first aspect, in a sixteenth possible implementation manner, the preset identification information includes operator identification information and the owner identification information; and the processor is further configured to match operator identification information of the UICC-type secure element with the preset operator identification information; and the processor is further configured to match owner identification information of the UICC-type secure element with the preset owner identification information when the operator identification information of the UICC-type secure element matches the preset operator identification information.

With reference to the first to the sixteenth possible implementation manners of the first aspect, in a seventeenth possible implementation manner, the processor is further configured to set the other secure elements to the normal working state when the identification information of the first secure element matches the preset identification information and the first secure element is removed.

According to a second aspect, the present disclosure provides an embodiment of a secure element management method.

In a first possible implementation manner, the method is applied to a terminal that includes at least two secure element interfaces, where the method includes: when a first secure element is connected to the secure element interfaces, acquiring identification information of the connected first secure element; acquiring preset identification information, where the preset identification information is used to identify an exclusive secure element; matching the identification information of the first secure element with the preset identification information; and when the identification information of the first secure element matches the preset identification information, setting the first secure element to a normal working state, and setting connected other secure elements on the terminal to a non-normal working state, where the other secure elements are secure elements connected to the secure element interfaces.

With reference to the first possible implementation manner of the second aspect, in a second possible implementation manner, the method further includes: setting both the first secure element and the other secure elements to the normal working state when the identification information of the first secure element does not match the preset identification information and identification information of the other secure elements does not match the preset identification information.

With reference to the second possible implementation manner of the second aspect, in a third possible implementation manner, that the identification information of the other secure elements does not match the preset identification information includes: acquiring the identification information of the connected other secure elements; matching the identification information of the other secure elements with the preset identification information; and determining that the identification information of the other secure elements does not match the preset identification information.

With reference to the second possible implementation manner of the second aspect, in a fourth possible implementation manner, the terminal stores information about matching between identification information of secure elements connected to the secure element interfaces and the preset identification information; and that the identification information of the other secure elements does not match the preset identification information includes: acquiring the information about matching between identification information of secure elements connected to the secure element interfaces and the preset identification information; and determining that the identification information of the other secure elements does not match the preset identification information.

With reference to any one of the first to the fourth possible implementation manners of the second aspect, in a fifth possible implementation manner, the identification information includes owner identification information, where the owner identification information is used to identify a secure element issuer.

With reference to any one of the first to the fifth possible implementation manners of the second aspect, in a sixth possible implementation manner, before the acquiring identification information of the connected first secure element, the method further includes: when the terminal detects that a quantity of secure elements connected to the at least two secure element interfaces changes, disabling NFC applications installed on all secure elements connected to the secure element interfaces.

With reference to any one of the first to the sixth possible implementation manners of the second aspect, in a seventh possible implementation manner, the setting the first secure element to a normal working state includes: setting the first secure element to an enabled state; creating a logical channel between a processor of the terminal and an NFC controller of the terminal, where the logical channel is used for communication between the processor and the first secure element; and configuring routing information of an application installed on the first secure element into a routing table of the NFC controller.

With reference to the seventh possible implementation manner of the second aspect, in an eighth possible implementation manner, the method further includes: configuring the routing information of the application installed on the first secure element into a routing table maintained by the processor.

With reference to any one of the first to the sixth possible implementation manners of the second aspect, in a ninth possible implementation manner, the setting connected other secure elements on the terminal to a non-normal working state includes at least one of the following implementation manners: setting the other secure elements to a disabled state; setting a control switch on a control circuit that connects the other secure elements and the NFC controller to an open state; or deleting routing information, stored in a routing table of the NFC controller, of an application installed on the other secure elements.

With reference to any one of the first to the ninth possible implementation manners of the second aspect, in a tenth possible implementation manner, the acquiring identification information of the first secure element includes: sending, by the terminal, a query message to the first secure element, where the query message is used to query the identification information of the first secure element; and receiving, by the terminal, an answer message sent by the first secure element, where the answer message includes the identification information of the first secure element.

With reference to any one of the first to the ninth possible implementation manners of the second aspect, in an eleventh possible implementation manner, the acquiring identification information of the first secure element includes: sending, by the processor of the terminal, a query message to the NFC controller, where the query message is used to query the identification information of the first secure element connected to the NFC controller; and receiving, by the processor of the terminal, an answer message sent by the NFC controller, where the answer message includes the identification information of the first secure element.

With reference to any one of the first to the ninth possible implementation manners of the second aspect, in a twelfth possible implementation manner, the secure element interfaces include a UICC secure element interface, where the UICC secure element interface is configured to connect to a UICC-type secure element; and the acquiring identification information of the first secure element includes: sending, by the terminal, a query request to a server, where the query request is used to query identification information of the UICC-type secure element; and receiving, by the terminal, an answer message sent by the server, where the answer message includes the identification information of the UICC-type secure element.

With reference to any one of the first to the ninth possible implementation manners of the second aspect, in a thirteenth possible implementation manner, the secure element interfaces include a UICC secure element interface, where the UICC secure element interface is configured to connect to a UICC-type secure element; and the acquiring identification information of the first secure element includes: receiving, by the terminal, an ATR message sent by a UICC, and acquiring identification information of the UICC-type secure element.

With reference to the twelfth or the thirteenth possible implementation manner of the second aspect, in a fourteenth possible implementation manner, the preset identification information includes operator identification information and the owner identification information; and the matching the identification information of the first secure element with the preset identification information includes: matching operator identification information of the UICC-type secure element with the preset operator identification information; and matching owner identification information of the UICC-type secure element with the preset owner identification information when the operator identification information of the UICC-type secure element matches the preset operator identification information.

With reference to any one of the first to the fourteenth possible implementation manners of the second aspect, in a fifteenth possible implementation manner, the method further includes: setting the other secure elements to the normal working state when the identification information of the first secure element matches the preset identification information and the first secure element is removed.

According to a third aspect, the present disclosure provides an embodiment of a terminal.

In a first possible implementation manner, the terminal includes: a first acquiring unit, configured to, when a first secure element is connected to the secure element interfaces, acquire identification information of the connected first secure element; a second acquiring unit, configured to acquire preset identification information, where the preset identification information is used to identify an exclusive secure element; a matching unit, configured to match the identification information of the first secure element with the preset identification information; a setting unit, configured to, when the identification information of the first secure element matches the preset identification information, set the first secure element to a normal working state, and set connected other secure elements on the terminal to a non-normal working state, where the other secure elements are secure elements connected to the secure element interfaces.

With reference to the first possible implementation manner of the third aspect, in a second possible implementation manner, the setting unit is further configured to set both the first secure element and the other secure elements to the normal working state when the identification information of the first secure element does not match the preset identification information and identification information of the other secure elements does not match the preset identification information.

With reference to the second possible implementation manner of the third aspect, in a third possible implementation manner, the terminal further includes: a third acquiring unit, configured to acquire the identification information of the connected other secure elements; a first determining unit, configured to match the identification information of the other secure elements with the preset identification information, and determine that the identification information of the other secure elements does not match the preset identification information.

With reference to the second possible implementation manner of the third aspect, in a fourth possible implementation manner, the terminal further includes: a storing unit, configured to store information about matching between identification information of secure elements connected to the secure element interfaces and the preset identification information; and a second determining unit, configured to acquire the information about matching between identification information of secure elements connected to the secure element interfaces and the preset identification information, and determine that the identification information of the other secure elements does not match the preset identification information.

With reference to any one of the first to the fourth possible implementation manners of the third aspect, in a fifth possible implementation manner, the terminal further includes: a disabling unit, configured to, before the first acquiring unit acquires the identification information of the connected first secure element, when the terminal detects that a quantity of secure elements connected to the at least two secure element interfaces changes, disable NFC applications installed on all secure elements connected to the secure element interfaces.

With reference to any one of the first to the fifth possible implementation manners of the third aspect, in a sixth possible implementation manner, the setting unit is further configured to: set the first secure element to an enabled state; create a logical channel between a processor of the terminal and an NFC controller of the terminal, where the logical channel is used for communication between the processor and the first secure element; and configure routing information of an application installed on the first secure element into a routing table of the NFC controller.

With reference to the sixth possible implementation manner of the third aspect, in a seventh possible implementation manner, the setting unit is further configured to configure the routing information of the application installed on the first secure element into a routing table maintained by the processor.

With reference to any one of the first to the fifth possible implementation manners of the third aspect, in an eighth possible implementation manner, that the setting unit is further configured to perform at least one of the following setting manners: setting the other secure elements to a disabled state; setting a control switch on a control circuit that connects the other secure elements and the NFC controller to an open state; or deleting routing information, stored in a routing table of the NFC controller, of an application installed on the other secure elements.

With reference to any one of the first to the eighth possible implementation manners of the third aspect, in a ninth possible implementation manner, the first acquiring unit includes: a first sending unit, configured to send a query message to the first secure element, where the query message is used to query the identification information of the first secure element; and a first receiving unit, configured to receive an answer message sent by the first secure element, where the answer message includes the identification information of the first secure element.

With reference to any one of the first to the eighth possible implementation manners of the third aspect, in a tenth possible implementation manner, the first acquiring unit includes: a second sending unit, configured to send a query message to the NFC controller, where the query message is used to query the identification information of the first secure element connected to the NFC controller; and a second receiving unit, configured to receive an answer message sent by the NFC controller, where the answer message includes the identification information of the first secure element.

With reference to any one of the first to the eighth possible implementation manners of the third aspect, in an eleventh possible implementation manner, the secure element interfaces include a UICC secure element interface, where the UICC secure element interface is configured to connect to a UICC-type secure element; and the first acquiring unit includes: a third sending unit, configured to send a query request to a server, where the query request is used to query identification information of the UICC-type secure element; and a third receiving unit, configured to receive an answer message sent by the server, where the answer message includes the identification information of the UICC-type secure element.

With reference to any one of the first to the eighth possible implementation manners of the third aspect, in a twelfth possible implementation manner, the secure element interfaces include a UICC secure element interface, where the UICC secure element interface is configured to connect to a UICC-type secure element; and the first acquiring unit is further configured to receive an ATR message sent by a UICC, and acquire identification information of the UICC-type secure element.

With reference to the eleventh or the twelfth possible implementation manner of the third aspect, in a thirteenth possible implementation manner, the preset identification information includes operator identification information and the owner identification information; and the matching unit is further configured to match operator identification information of the UICC-type secure element with the preset operator identification information; and the matching unit is further configured to match owner identification information of the UICC-type secure element with the preset owner identification information when the operator identification information of the UICC-type secure element matches the preset operator identification information.

With reference to any one of the first to the thirteenth possible implementation manners of the third aspect, in a fourteenth possible implementation manner, the setting unit is further configured to set the other secure elements to the normal working state when the identification information of the first secure element matches the preset identification information and the first secure element is removed from the terminal.

In the embodiments of the present disclosure, when a first secure element is connected to the secure element interfaces, the terminal acquires identification information of the connected first secure element; acquires preset identification information, where the preset identification information is used to identify an exclusive secure element; matches the identification information of the first secure element with the preset identification information; and when the identification information of the first secure element matches the preset identification information, sets the first secure element to a normal working state, and sets connected other secure elements on the terminal to a non-normal working state, so that the terminal supports a management mode of an exclusive secure element, a requirement of an exclusive secure element issuer, for example, a mobile communications network operator, for taking control of a secure element of the terminal is met, and payment efficiency of mobile payment is improved.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
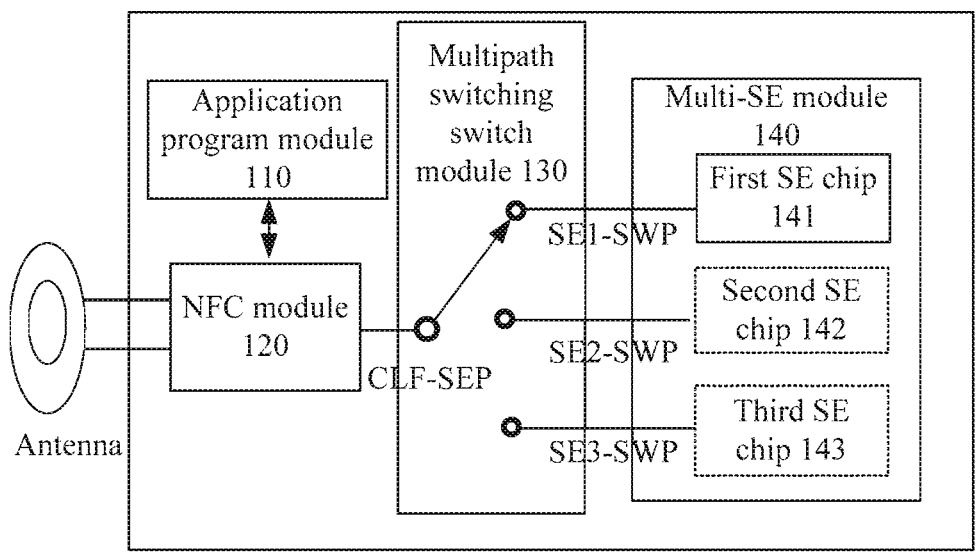
FIG. 1 is a schematic structural diagram of a mobile payment terminal according to the prior art.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure. To facilitate understanding of the technical solutions described in the embodiments of the present specification, the following gives necessary introductions to some technical terms in the technical solutions. It should be understood that the descriptions of technical terms in this part does not constitute a limitation on the technical solutions described in the present specification.

A terminal, also referred to as a user equipment (UE), a mobile user equipment, or the like, may communicate with one or more core networks by using a radio access network (RAN). For example, a mobile phone (or referred to as a "cellular" phone) and a computer, which may be, for example, a portable, pocket-sized, handheld, computer built-in, or vehicle-mounted mobile apparatus, exchange voice and/or data with a radio access network.

A secure element (SE), which is an electronic component having a tamper-resistant function, may be installed on a terminal to provide an application installed on the secure element with a secure and confidential environment for data storage and operating. Broadly speaking, a hardware device that provides storage space for installing an application and has a function of managing the installed application may be considered as a secure element. For example, third-party applications may be installed on a smart phone on which an Android (Android) system is installed, and the Android operating system may manage the third-party applications and provide certain protection; therefore, the smart phone may be considered as a secure element in a broad sense. The term corresponding to a secure element varies with different standards, for example, in the series of Global Platform standards, the term SE (Secure Element) is defined and used; however, in the series of NFC Forum standards, the term NFC execution environment (NFCEE) instead of SE is used. It should be noted that, in the embodiments of the present disclosure, these two terms are equivalent in terms of meanings.

An NFC controller (NFCC) is a logical entity that is responsible for sending data to an NFC radio frequency interface, and is often used to refer to a chip that implements this function. An interface on one end of the NFC controller is connected to an NFC antenna, and the other end is connected to a device processor such as a CPU (DH), and various NFC operating environments.

A management entity (ME) is a logical entity used to manage multiple secure elements installed on a same terminal, may be implemented in a software or hardware manner. The management entity may be used to enable/disable a secure element, for example, the management entity may implement enabling/disabling of a secure element by opening/closing a logical channel between the secure element and an NFC controller. In the present application, Enable/disable (Enable/Disable) refers to an operation that is performed on the secure element, and an application installed on a disabled secure element cannot interact with a remote NFC entity (for example, a card reader) by using the NFC controller and the NFC antenna. The Management Entity may further have a function of aggregating data communication traffic of multiple secure elements, that is, data transmission between each secure element and the NFC controller passes through the Management Entity.

Route (Routing/Route) refers to application path information stored in a routing table of the NFC controller. The NFC controller may be connected to multiple secure elements, and an application may be installed on each secure element. When the remote NFC entity interacts with an application installed on the terminal, the NFC controller needs to provide path information that is related to the installed application on the terminal and is stored in the routing table of the NFC controller, otherwise, a session cannot be established. The path information herein is a route and is generally in a form of an application identifier (AID)/an ID of a secure element on which the application locates/a current status of the secure element, and the path information may also include another form. A processor of the terminal may also maintain such a routing table.

The Single Wire Protocol (SWP), formulated by the European telecommunications standards institute (ETSI), is an interface protocol used for information transmission between a non-contact communications module (including the NFC controller) and a universal subscriber identity module (USIM) card. To be specific, the SWP protocol defines a physical connection form, a bottom-layer (including a physical layer and a data link layer) signal transmission requirement, and the like of information transmission between the non-contact communications module and a secure element chip inside the USIM card. A host controller interface (HCI), also formulated by the ETSI, defines a logical protocol that is based on a host (Host), a gate (GATE), and a pipe (PIPE) and is responsible, on top of each layer of the SWP protocol, for logical transmission pipe establishment, routing, and the like. In the embodiments of the present disclosure, the SWP/HCI each is an interface manner between a secure element and an NFC controller. A physical wire is used between the secure element and the NFC controller to implement data receiving and sending and run a full-duplex data communication protocol. Particularly, for a UICC secure element, a C6 pin of a UICC is connected to an SWP interface of the NFC controller.

NFC wired interface (NFC-WI), an interface manner between a secure element and an NFC controller, is used for communication between the NFC controller and the secure element. Two physical wires are used between the secure element and the NFC controller to implement data receiving and sending, where the two wires are respectively SIGIN and SIGOUT. The interface has three states: off, wired, and virtual. When the interface is in an off mode, the secure element and the NFC controller are logically disconnected, and the secure element cannot communicate with the an external device by using the NFC controller; when the interface is in a wired mode, the secure element is connected to a processor by using the NFC controller, and the processor may configure the secure element; and when the interface is in a virtual mode, the secure element may communicate with a remote NFC card reader by using the processor.

An exclusive secure element (XSE) is a type of secure elements. After the exclusive secure element is installed on a terminal, applications on other secure elements installed on the terminal are all disabled and cannot be accessed by an external device, and only an application on the exclusive secure element can communicate with a remote NFC device. Generally, the exclusive secure element is a pluggable secure element. If an embedded SE is an exclusive secure element, other secure elements cannot be installed on the terminal, where the terminal is a terminal of a single secure element.

Before specific descriptions are given to the embodiments of the present disclosure, it should be noted that FIG. 1 to FIG. 8 exemplarily describe a structural composition of the terminal in the embodiments of the present disclosure from the perspective of a hardware module. FIG. 9 to FIG. 13 exemplarily describe the method part in the embodiments of the present disclosure. FIG. 14 to FIG. 28 further exemplarily describe the structural composition of the terminal in the embodiments of the present disclosure from the perspective of a function module. Correspondingly, specific embodiments of the present disclosure are accordingly classified into three categories, that is, hardware module apparatus embodiment, method embodiment, and software module apparatus embodiment. Among the three categories of embodiments, same or corresponding technical features may be learned from each other. The protection scope of the present disclosure may include a combination of technical features in the following three categories of embodiments.

Hardware Module Apparatus Embodiment Part

Figure 2:
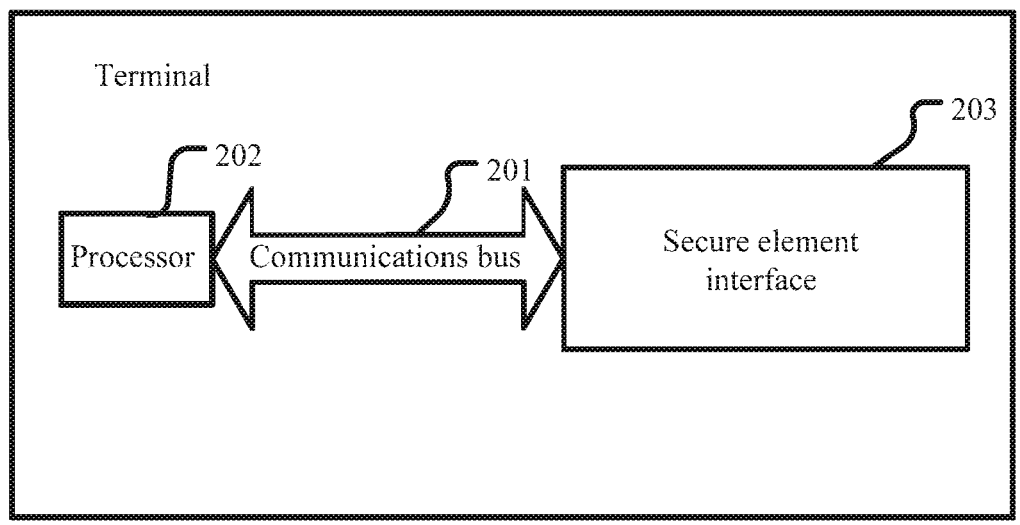
FIG. 2 is a schematic structural diagram of an embodiment of a terminal according to an embodiment of the present disclosure.
Figure 3:
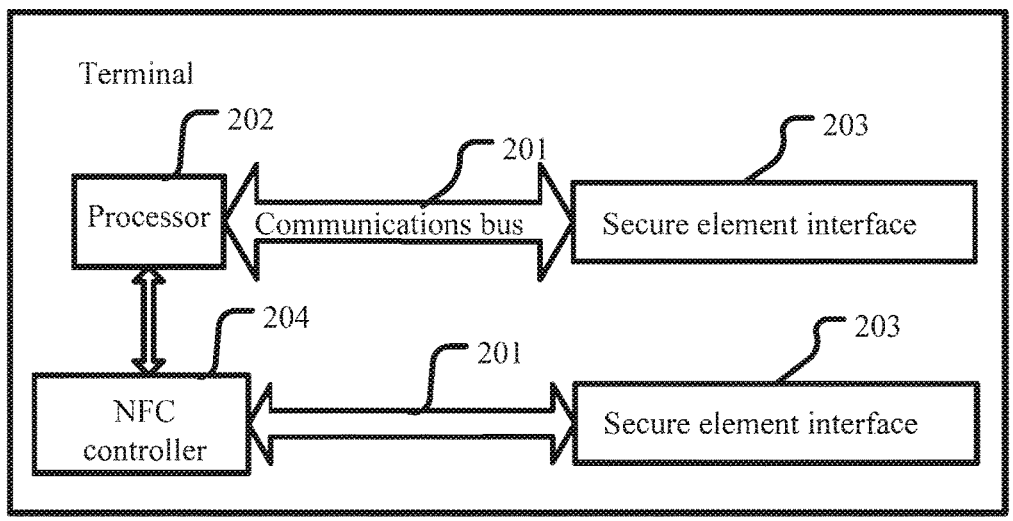
FIG. 3 is a schematic structural diagram of an embodiment of a terminal according to an embodiment of the present disclosure.

Referring to FIG. 2, FIG. 2 shows a terminal according to an embodiment of the present disclosure. The terminal provided in this embodiment of the present disclosure includes a processor 202, at least two secure element interfaces 203, and a communications bus 201 that connects the processor 202 and the secure element interfaces 203. The processor 202 is connected to the at least two secure element interfaces 203 by using the communications bus. Specifically, the processor 202 may be directly connected to the secure element interfaces 203, that is, a signal, after being transmitted from one electronic device (for example, the processor 202), may directly reach another electronic device (for example, the secure element interfaces 203 or the processor 202) by using the communications bus; the processor 202 may also be indirectly connected to the secure element interfaces 203, that is, another electronic device, for example, an NFC controller, is further connected to the communications bus that is between the processor 202 and the secure element interfaces 203, and a signal, after being transmitted from one electronic device (for example, the processor 202), may be transferred to another electronic device (for example, the secure element interfaces 203) by using the another electronic device (for example, an NFC controller) connected to the communications bus. Optionally, as shown in FIG. 3, the terminal further includes an NFC controller 204, where the NFC controller 204 is connected to the processor 202, and the secure element interfaces 203 are connected to the NFC controller 204. After a first secure element is connected to the secure element interface 203, the first secure element is connected to the NFC controller 204.

Figure 4:
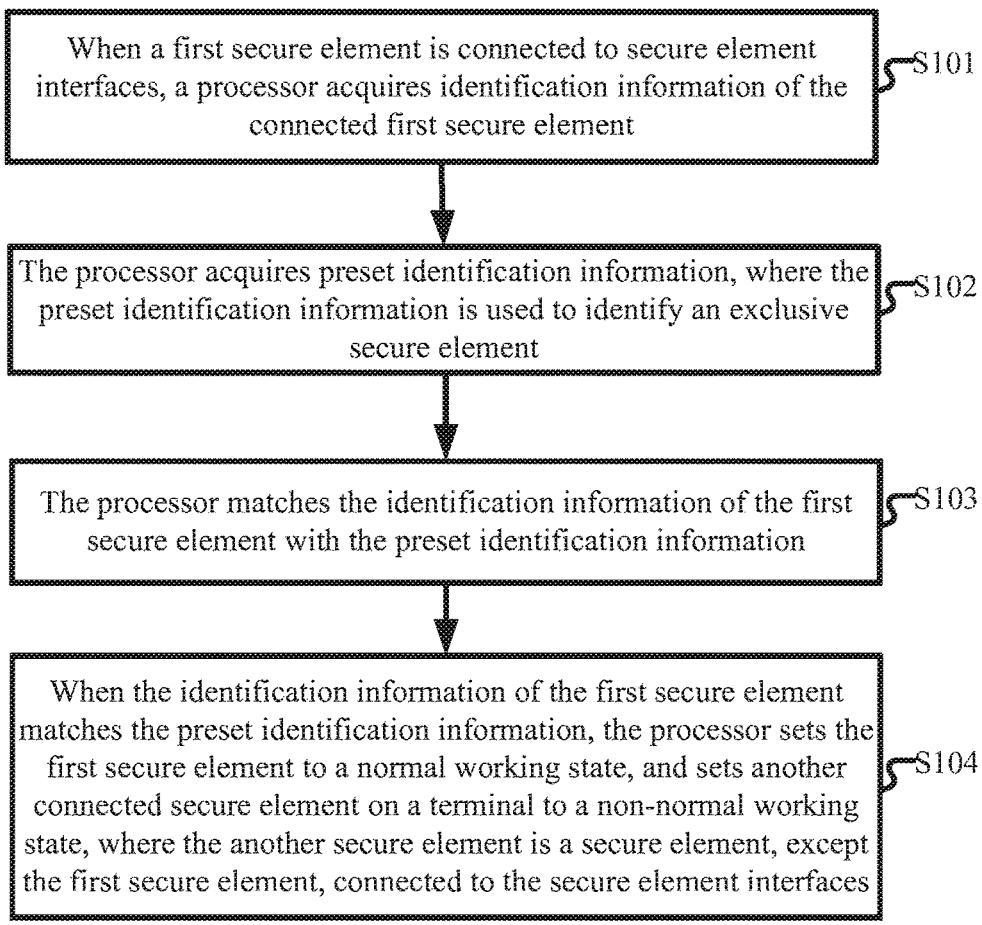
FIG. 4 is a schematic flowchart of an embodiment of executing, by a terminal, a method embodiment of the present disclosure according to an embodiment of the present disclosure.

The processor 202 may be configured to execute the method shown in FIG. 4:

S101. When the first secure element is connected to the secure element interfaces, the processor acquires identification information of the connected first secure element.

Optionally, the identification information of the first secure element that is acquired by the processor 202 may be owner identification information of the first secure element, where the owner identification information is used to identify an issuer of the secure element. For example, the first secure element may use an issuer ID or card issuer data included in an ATR, or VERSION_SW+VERSION_HW+ VENDOR_NAME included in an HCI as owner identification information, where the information is used to identify an issuer (for example, a mobile communications network operator) of the first secure element. When the first secure element is a UICC-type secure element, the identification information of the first secure element may further include an integrated circuit card identity (ICCID) of a UICC, where the UICC-type secure element is a secure element supported by the universal integrated circuit card (UICC). The owner identification information of the first secure element may further include related information about an operator of the first secure element or related information about a management body that manages the first secure element, for example, owner identification information (Owner ID) of the first secure element, where the Owner ID may include issuer information (Issuer ID) of a secure element. This embodiment of the present disclosure sets no limitation thereto.

Figure 5:
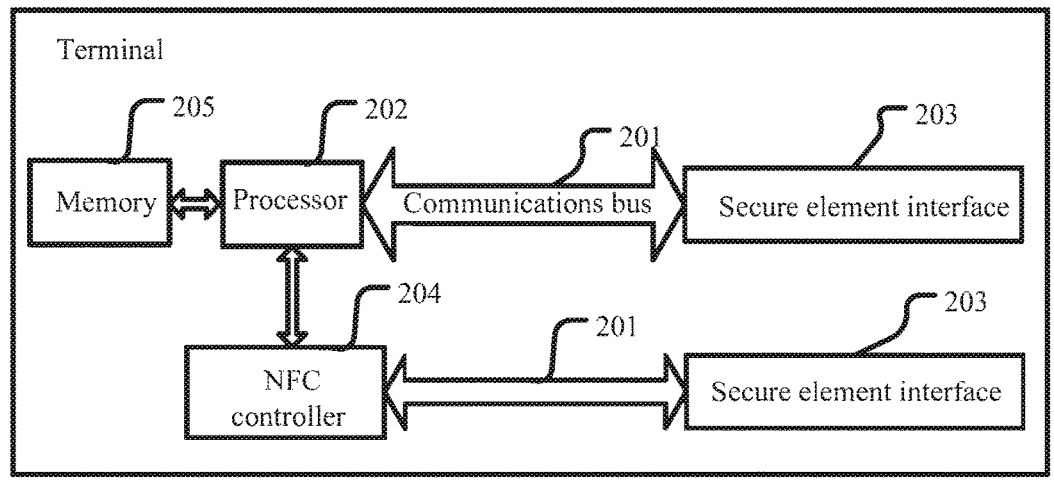
FIG. 5 is a schematic structural diagram of an embodiment of a terminal according to an embodiment of the present disclosure.

Optionally, as shown in FIG. 5, the terminal may further include a memory 205, where the memory 205 is connected to the processor 202. The terminal includes at least two secure element interfaces 203. After the processor 202 acquires the identification information about the first secure element, when the processor 202 further detects that a second secure element is connected to other secure elements interface 203, the memory may store the identification information of the first secure element, the processor 202 may acquire identification information of the second secure element, and the memory 205 may further be configured to store the identification information of the second secure element. Further, the memory 205 may be configured to store identification information of all secure elements connected to the secure element interfaces 203. When identification information of multiple secure elements is stored in the memory 205, the memory 205 may further store a secure element management program. The processor 202 invokes the secure element management program, generates a secure element configuration table, and maintains the secure element configuration table by running the secure element management program. The configuration table may include identification information of all secure elements connected to the at least two secure element interfaces 203. The secure element management program may be installed when the terminal is delivered from a factory, or may be installed, in a manner of system updating, on the terminal after the terminal is delivered from a factory.

In the embodiments of the present disclosure, a terminal that supports Android 4.4 host-based card emulation, that is, a host-based card emulation function, may be considered as a secure element in a broad sense.

S102. The processor acquires preset identification information, where the preset identification information is used to identify an exclusive secure element.

Specifically, identification information of the exclusive secure element is preset in the terminal, and a secure element corresponding to the preset identification information of the exclusive secure element is the exclusive secure element. The processor 202 acquires the preset identification information, where the preset identification information may be preset owner identification information of the exclusive secure element; and the foregoing preset identification information may further include identification information of an exclusive secure element operator, that is, a mobile operator. Optionally, the secure element configuration table stored in the memory may include the preset identification information of the exclusive secure element, for example, the preset owner identification information of the exclusive secure element. For ease of description, in the embodiments of the present disclosure, the preset identification information may also be referred to as preset identification information of an exclusive secure element.

S103. The processor matches the identification information of the first secure element with the preset identification information.

After acquiring the identification information of the first secure element and acquiring the preset identification information, the processor 202 matches the identification information of the first secure element with the preset identification information of the exclusive secure element (XSE), and further determines whether the first secure element is the exclusive secure element.

Optionally, the performing, by the processor 202, matching between the identification information of the first secure element and the preset identification information of the exclusive secure element may be matching the owner identification information of the first secure element with the preset owner identification information of the exclusive secure element.

Optionally, when the first secure element is a UICC-type secure element, the preset identification information includes operator identification information and the owner identification information. That the processor 202 matches the identification information of the first secure element with the preset identification information includes that: the processor 202 matches operator identification information of the UICC-type secure element with the preset operator identification information; and matches owner identification information of the UICC-type secure element with the preset owner identification information when the operator identification information of the UICC-type secure element matches the preset operator identification information.

Optionally, the processor 202 matches the identification information of the first secure element with the preset identification information of the exclusive secure element; and when the management entity is a hardware entity, for example, the management entity is a component or a chip integrated into an electronic device, the processor 202 may implement identifying and management of the exclusive secure element by using the management entity (ME). When the management entity is a software entity, the processor may run the management entity, and implement matching between the identification information of the first secure element and the preset identification information of the exclusive secure element.

S104. When the identification information of the first secure element matches the preset identification information, the processor sets the first secure element to a normal working state, and sets connected other secure elements on the terminal to a non-normal working state, where the other secure elements are secure elements connected to the secure element interfaces.

When the processor 202 determines that identification information of the first secure element matches the preset identification information of the exclusive secure element, the processor 202 may determine that the first secure element is the exclusive secure element. Based on a feature of the exclusive secure element, the processor 202 sets the first secure element to the normal working state, and sets the other secure elements connected to the secure element interface 203 to the non-normal working state.

Specifically, the processor 202 sets a working status of the first secure element according to a result of the matching between the identification information of the first secure element and the preset identification information of the exclusive secure element. The working status refers to whether a secure element is in the normal working state, that is, whether the secure element is in the normal working state or in the non-normal working state. Before explanations and descriptions are given to the working status, it is necessary to describe another group of states of a secure element used in this embodiment of the present disclosure, that is, an enabled state and a disabled state. The enabled state and the disabled state indicate whether a secure element is available, and the normal working state and the non-normal working state indicate whether a secure element may work normally.

The enabled state refers to a state (ENABLED) of a particular secure element that is set by the NFC controller according to a secure element ID) after the processor sends an Enable command to the NFC controller, where the Enable command includes identification information (for example, the secure element ID) of the particular secure element. The disabled state refers to another state (DISABLED) of a particular secure element that is set by the NFC controller after the processor sends a Disable command to the NFC controller, where, likewise, the Disable command includes identification information (for example, a secure element ID) of the particular secure element.

It may be determined whether the secure element is in the normal working state only on the basis that the secure element is in the enabled state. Whether the secure element is in the normal working state is not only restricted by whether the secure element is in the enabled state/disabled state, but also restricted by other factors. For example, when the terminal further includes the NFC controller, to set the secure element to be in the normal working state, in addition to setting the secure element to be in the enabled state, the processor further needs to create a logical channel between the processor and the NFC controller, where the logical channel is used to transmit data between the processor and the secure element, so as to ensure that the secure element changes, according to a command received from the logical channel, a status of an application installed on the secure element, and the processor further needs to configure routing information of an application associated with the secure element into a routing table of the NFC controller.

Based on thereon, in this embodiment of the present disclosure, the setting the secure element to be in the normal working state refers to setting the secure element to be in the enabled state, creating a logical channel (the logical channel is used for communication between the processor and the secure element) between the processor and the NFC controller, and meanwhile, configuring routing information of an application on the secure element into a routing table of the NFC controller. The setting the secure element to be in the non-normal working state may be setting the secure element to be in the disabled state; or disconnecting a logical connection between the secure element and the processor; or deleting routing information of the secure element from a routing table of the NFC controller; or not configuring routing information of the secure element into a routing table of the NFC controller; or the like. In other words, in the embodiments of the present disclosure, to set the secure element to be in the normal working state, three conditions are met simultaneously, that is: the secure element is in the enabled state, a logical channel is created between the processor and the NFC controller, and meanwhile, routing information of an application on the secure element is configured into a routing table of the NFC controller. Only in a case in which all of the foregoing three conditions are met, the application on the secure element may be used normally, and the secure element may enter the normal working state and normally implement a function of the secure element. Correspondingly, for setting the secure element to be in the non-normal working state, provided that at least one of the foregoing three conditions is not met, the application on the secure element cannot normally perform data transmission, and the secure element cannot normally implement the function of the secure element. It should be noted that, among the conditions that need to be met for setting the secure element to be in the normal working state or the non-normal working state in this embodiment of the present disclosure, the NFC controller mentioned herein is merely an optional apparatus in this embodiment of the present disclosure, and another alternative apparatus that may implement an objective of the present disclosure shall fall within the protection scope of the embodiments of the present disclosure.

It should be further noted that, among the foregoing three conditions met for the normal working state, that a logical channel (the logical channel is used for communication between the processor and the secure element) is created between the processor and the NFC controller includes that the logical channel between the processor and the NFC controller is in a continuously-connected state of a normal connection. Meanwhile, that a logical channel is created between the processor and the NFC controller further includes an implied condition, that is, a control circuit between logical channel connection bodies are in a normally connected state, that is: a control circuit between the processor and the NFC controller is in a connected state, a control circuit between the NFC controller and the secure element is in a connected state, and a current or a signal may normally circulate through the control circuit. In other words, creation of a logical channel at a software layer is only considered on a premise that a hardware circuit between the logical channel connection bodies are in a normally connected state.

Certainly, in addition to the three factors, that is, the enabled state/disabled state of the secure element, whether a logical channel connection is created, and configuration of routing information, in a routing table of the NFC controller, of an application on the secure element, the determining whether the secure element of the terminal is in the normal working state may further be affected by other factors, which are not limited in this embodiment of the present disclosure.

Specifically, in this embodiment of the present disclosure, the setting, by the processor 202, the enabled state/disabled state of the secure element may be implemented, optionally, by using an NFCEE_MODE_SET_CMD command defined by the NFC Forum NCI Spec. The processor 202 sends the NFCEE_MODE_SET_CMD command to the NFC controller, where the NFCEE_MODE_SET_CMD command includes an ID of a particular secure element and an enable/disable parameter. Because the NFCEE_MODE_SET_CMD command needs to include an ID of a particular secure element, by using one NFCEE_MODE_SET_CMD command sent by the processor 202, only one particular secure element may be set. To set working statuses of several secure elements, the processor 202 needs to send several NFCEE_MODE_SET_CMD commands to the NFC controller. The NFC controller enables or disables a secure element according to an NFCEE_ID and the enable/disable parameter in the NFCEE_ MODE_SET_CMD command, and sets the secure element to be in the enabled state or the disabled state. Specifically, when the identification information of the first secure element matches the preset identification information of the exclusive secure element, the processor 202 may set a control circuit between the secure element interface 203 of the first secure element and the NFC controller to a connected state, so as to set the first secure element to the normal working state. The processor 202 may set a control circuit between a secure element interface of the other secure elements and the NFC controller to the disconnected state, so as to set the secure elements whose identification information does not match the preset identification information to the non-normal working state. Optionally, the control circuit between the NFC controller and the other secure element interfaces 203 may share one control switch. For example, a control switch may be disposed on the control circuit between the secure element interfaces and the NFC controller, and the first secure element may be installed on a preset position of the terminal, for example, a preset card slot. A control circuit, on a position except the preset position, between secure element interfaces of other secure elements and the NFC controller may share one control switch. When the identification information of the first secure element matches the preset identification information of the exclusive secure element, the processor 202 determines that the first secure element is the exclusive secure element, sends a control signal to the control circuit to set a control switch of a control circuit between the first secure element and the NFC controller to be in a closed state and the control circuit between the first secure element and the NFC controller to be in the connected state, and may further set the first secure element to be in the normal working state. The processor 202 sends a control signal to the control circuit to set a control switch shared between the other secure elements and the NFC controller to be in an open state, further set the control circuit between the secure element interfaces of the other secure elements and the NFC controller to be in a disconnected state, and sets the other secure elements to be in the non-normal working state. For example, when a manner of an NFC-WI interface is used between the NFC controller and the exclusive secure element, the processor may set the NFC-WI interface to be in a wired mode, the exclusive secure element is connected to the processor by using the NFC controller, and the processor may set the exclusive secure element to be in the normal working state; or, the processor sets the NFC-WI interface to be in a virtual mode, and the exclusive secure element may be set to communicate with a remote NFC card reader; when a manner of an SWP interface is used between the NFC controller and the secure element interface, the processor may set a terminal interface to be connected only to an SWP interface of the exclusive secure element, and further set the exclusive secure element to be in the normal working state.

Specifically, the processor 202 creates a logical channel between the processor 202 and the NFC controller. It should be noted that, in a definition in a related standard, execution actions related to the logical channel includes two actions: creating (Create) the logical channel and closing (Close) the logical channel. Each time when the terminal creates a logical channel, to facilitate connection management, an identification (ID) number is set for the logical channel, and when the logical channel is not used within a preset period, the terminal may close the logical channel. In the present application, the creating a logical channel may include keeping a continuous state process in which the logical channel has been created and the logical channel is in the connected state, that is, a dynamic connection process, between creation of the logical channel and close of the logical channel, in which the logical channel keeps connected.

Further, the terminal includes a management entity, where the management entity may be a component or a chip integrated into an electronic device of the terminal. The processor 202 may send a query instruction to the management entity, where the query instruction is used to instruct the management entity to query the identification information of the first secure element. After acquiring the identification information of the first secure element, the management entity sends the identification information of the first secure element to the processor 202. The processor matches the identification information of the first secure element with the preset identification information. When the identification information of the first secure element matches the preset identification information of the exclusive secure element, the processor 202 may set the first secure element to the enabled state, and create a logical channel between the management entity and the first secure element, and the management entity sends a creating status of the logical channel to the processor 202; and meanwhile, the processor 202 configures routing information of an application on the first secure element into a routing information table of the NEC controller. The processor 202 may send a corresponding instruction to the NFC controller, and may perform data transmission with the first secure element, where the first secure element is in the normal working state.

Specifically, when the identification information of the first secure element matches the preset identification information of the exclusive secure element, the processor 202 may configure routing information of the first secure element into the routing table of the NFC controller, so as to set the first secure element to the normal working state, and delete routing information of the other secure elements from the routing table of the NFC controller, so as to set the other secure elements to the non-normal working state. The processor 202 may determine path information of the application on the first secure element according to the routing information of the application on the first secure element, and further run, according to the path information of the application, the application to perform NFC communication with an external NFC entity. At the same time when the routing information of the first secure element is configured into the routing table of the NFC controller, the processor 202 may delete routing information of applications on the other secure elements from the routing table of the NFC controller, so that the terminal cannot acquire path information of the applications on the other secure elements, and cannot invoke a corresponding application to perform NFC communication with the external NFC entity. It should be noted that an objective of deleting the routing information is to ensure that routing information of a secure element that does not match the identification information of the exclusive secure element is not stored in the routing table of the NFC controller, and other steps or actions that can achieve this objective shall fall within the protection scope of the embodiments of the present disclosure. For example, when the routing information of the secure element that does not match the identification information of the exclusive secure element has not been stored in the routing table of the NFC controller, the processor 202 may also not add the routing information of the secure element that does not match the identification information of the exclusive secure element to the routing table. The routing table records routing information of an application on a secure element connected to the secure element interface 203, and in a specific implementation manner, routing information of the installed secure element may exist not in a form of a table, and may include another form, which is not limited in this embodiment of the present disclosure.

In this embodiment of the present disclosure, when a first secure element is connected to secure element interfaces, a processor acquires identification information of the connected first secure element; acquires preset identification information, where the preset identification information is used to identify an exclusive secure element; matches the identification information of the first secure element with the preset identification information; and when the identification information of the first secure element matches the preset identification information, sets the first secure element to a normal working state, and sets other connected secure elements on the terminal to a non-normal working state. According to this embodiment of the present disclosure, the terminal supports a management mode of an exclusive secure element, a requirement of an exclusive secure element issuer for exclusively taking control of a secure element of the terminal is met, and payment efficiency of mobile payment is improved.

In an embodiment of the present disclosure, the processor of the terminal may be further configured to set both the first secure element and the other secure elements to the normal working state when the identification information of the first secure element does not match the preset identification information and identification information of the other secure elements does not match the preset identification information. Specifically, when the identification information of the first secure element does not match the preset identification information, and the identification information of the other secure elements does not match the preset identification information, there is no exclusive secure element in secure elements connected to the at least two secure element interfaces. In this case, the processor may set all secure elements connected to the at least two secure element interfaces to the normal working state, where all the connected secure elements are in an equal status and in the normal working state.

Optionally, that the processor 202 determines that identification information of the other secure elements does not match the preset identification information includes that: the processor 202 acquires the identification information of the other connected secure elements; matches the identification information of the other secure elements with the preset identification information; and determines that the identification information of the other secure elements does not match the preset identification information. After the processor 202 determines that identification information of the first secure element does not match the preset identification information, the processor 202 acquires identification information of a second secure element, and matches the identification information of the second secure element with the preset identification information. The processor 202 may acquire identification information of each secure element of the other secure elements one by one, match the identification information of each secure element of the other secure elements with the preset identification information, and further determine whether the identification information of the other secure elements matches the preset identification information.

Optionally, as shown in FIG. 5, the terminal further includes the memory 205; the memory 205 is connected to the processor 202; the memory 205 stores information about matching between identification information of secure elements connected to the secure element interfaces 203 and the preset identification information; and that the processor 202 determines that identification information of the other secure elements does not match the preset identification information includes that: the processor 202 acquires the information that is stored in the memory 205 and about matching between identification information of secure elements connected to the secure element interfaces 203 and the preset identification information, and determines that the identification information of the other secure elements does not match the preset identification information. Specifically, when a secure element is connected to the at least two secure element interfaces 203, the processor 202 acquires identification information of the connected secure element; matches the identification information of the connected secure element with the preset identification information; and stores a result of the matching in the memory. That is, provided that a secure element is connected to the secure element interfaces 203, the processor 202 performs matching once, and stores information about matching between identification information of the secure element connected at this time and the preset identification information in the memory. The processor 202 may acquire information about matching between the identification information of the other secure elements and the preset identification information, and determine that the identification information of the other secure elements does not match the preset identification information.

When the identification information of the secure elements connected to the secure element interfaces does not match the preset identification information, no exclusive secure element exists on the terminal. In this case, the secure elements are in an equal status; and the processor may set all secure elements connected to the secure element interfaces to be in the normal working state. The implementation manner in this embodiment of the present disclosure supports collaborative working of multiple secure elements, and may be compatible with secure elements of multiple parties such as a mobile communications operator, a financial institution, a third-party mobile payment operator, which improves payment efficiency of mobile payment.

In the foregoing embodiment of the present disclosure, the identification information acquired by the processor may include owner identification information, where the owner identification information is used to identify a secure element issuer.

In the foregoing embodiment of the present disclosure, when it is detected that a quantity of secure elements connected to the at least two secure element interfaces changes, the processor is further configured to disable NFC applications installed on all secure elements connected to the secure element interfaces. Specifically, an NFC application is installed on the secure element, the NFC application installed on the secure element may be stored on the secure element, and the NFC application installed on the secure element may run in the secure element, and may further interact with a remote NFC application directly by using an NFCC without by using a CPU. Before it is detected that the quantity of secure elements connected to the at least two secure element interfaces changes, the processor acquires related information about secure elements that have been connected to the terminal, and acquires information, for example, an activated application list, about related applications on the secure elements that have been connected to the terminal. When it is detected that the quantity of secure elements changes, for example, it is detected that a UICC card (for example, a SIM, a UIM, or a USIM) is inserted or a MicroSD card is inserted into the terminal, in this case, a connected secure element is added to the terminal, and secure elements that have been connected to the terminal include the secure elements that have been previously connected to the terminal and the newly added connected secure element. That the terminal disables NFC applications related to all the connected secure elements includes: disabling activated applications on the previously connected secure elements, and prohibiting activation of an application on the newly added connected secure element. When the UICC card or the MicroSD card of the terminal is removed, the remaining connected secure elements on the terminal are secure elements in the previously-connected secure elements, and the terminal may disable activated applications on the remaining connected secure element, and achieve an objective of disabling, by the terminal, the NFC applications on the secure elements. In an embodiment of the present disclosure, the terminal includes an NFC controller 204, where the NFC controller 204 is connected to the processor 202, and the NFC controller 204 is connected to the secure element interfaces 203; and that the processor sets the first secure element to a normal working state includes that: the processor sends an instruction to the NFC controller, and sets the first secure element to the enabled state; creates a logical channel between the processor and the NFC controller, where the logical channel is used for communication between the processor and the first secure element; and configures routing information of an application installed on the first secure element into a routing table of the NFC controller. Specifically, that the processor 202 sets the first secure element to the normal working state needs to meet at least the foregoing three conditions. It should be noted that a channel may be preset in the terminal dedicated for setting, by the processor 202, the first secure element to an enabled state or a disabled state. The processor 202 creates the logical channel between the processor 202 and the NFC controller 204, so as to ensure communication between the processor 202, and the first secure element connected to the NFC controller 204.

Figure 6:
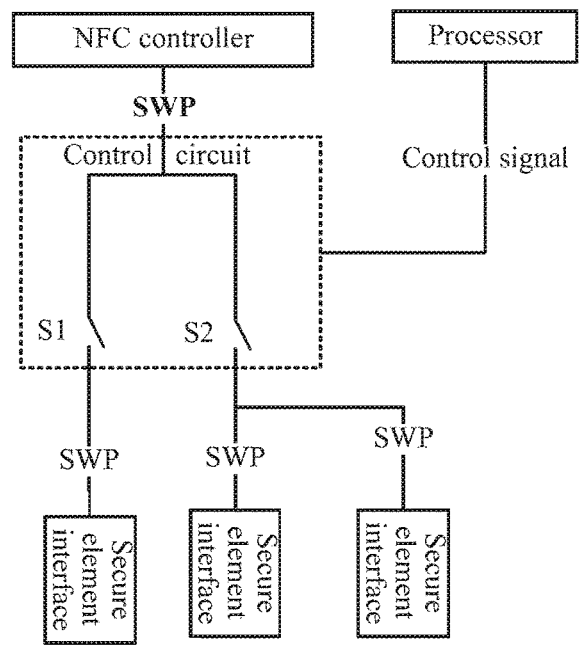
FIG. 6 is a schematic structural diagram of an embodiment of a terminal according to an embodiment of the present disclosure.
Figure 7:
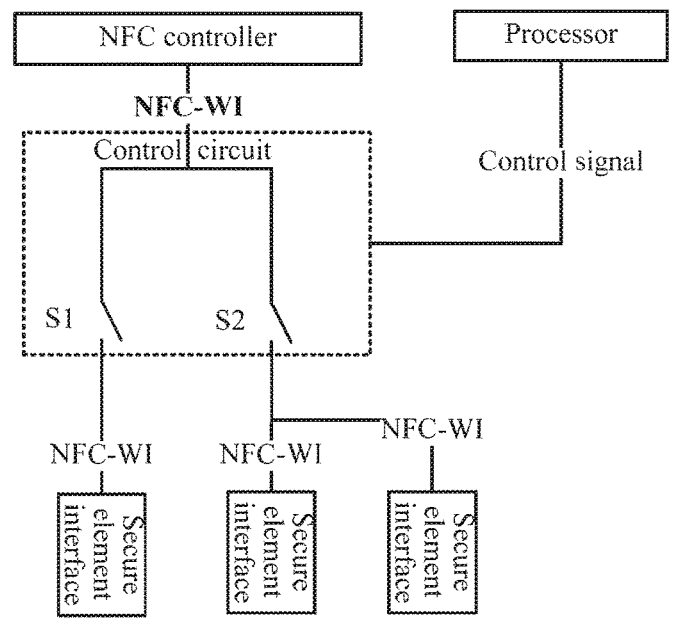
FIG. 7 is a schematic structural diagram of an embodiment of a terminal according to an embodiment of the present disclosure.

As shown in FIG. 6 or FIG. 7, in an embodiment of the present disclosure, the terminal further includes a control circuit and an NFC controller; the control circuit is connected to the processor; the control circuit is connected to the NFC controller; the control circuit is connected to the secure element interfaces; a control switch is disposed on the control circuit, where a first end of the control switch is connected to secure element interfaces connected to the other secure elements, and a second end of the control switch is connected to the NFC controller; and that the processor sets the other connected secure elements on the terminal to a non-normal working state includes that: the processor sends a control signal to the control circuit to set the control switch to an open state, where the control signal is used to instruct the control circuit to set the control switch that connects the other secure elements and the NFC controller to the open state. The terminal may set the other secure elements to be in the non-normal working state by using the control circuit. As mentioned above, among the three conditions for setting the secure element to be in the working state, that the control circuit is in the normally connected state is an implied condition for creating the logical channel between the processor and the NFC controller. When the control circuit is in the disconnected state, the processor cannot create the logical channel between the processor and the NFC controller. For example, a secure element interface connected to the control switch S1 is connected to the first secure element, and secure element interfaces connected to the control switch S2 are connected to the other secure elements. That is, after the first secure element is connected to a first secure element interface, an SWP connection between the first secure element and the NFC controller is controlled by the switch S1, and an SWP connection of a control circuit between the other secure elements and the NFC controller are controlled by the switch S2. When the processor matches the identification information of the first secure element with the preset identification information, and determines that the identification information of the first secure element is consistent with the identification information, preset in the terminal, of the exclusive secure element, the processor determines that the first secure element is the exclusive secure element. The processor sets the first secure element to be in the normal working state, and sets the other secure elements to be in the non-normal working state. Specifically, the processor sends a control signal to the control circuit; after receiving the control signal, the control circuit closes the switch S1 and opens the switch S2 to set a control circuit between the first secure element and the processor to be in the connected state and a control circuit between the other secure elements and the processor 202 to be in the disconnected state. Further, the other secure elements are in the non-normal working state.

In an embodiment of the present disclosure, the first secure element may be a secure element in a broad sense, for example, a terminal that supports android 4.4 host-based card emulation, that is, a host-based card emulation function. The terminal may be considered as the first secure element, and in this case, an application installed on the first secure element is an application installed on the terminal. The processor sets the first secure element to be in the normal working state, that is, sets the first secure element to the enabled state; and in addition to configuring routing information of an application installed on the first secure element into a routing table of the NFC controller, the processor is further configured to configure the routing information of the application installed on the first secure element into a routing table maintained by the processor. The processor maintains routing information of all applications that have been installed on the terminal; optionally, the routing information of all the installed application is stored on the terminal in a form of a routing table. The routing information may store an application identifier of an application installed on the terminal, where the application identifier is used to identify path information, and the path information may be information about a path, in which the application is installed, on the terminal. When the processor runs the application, the processor may invoke the path information of the application in the routing information maintained by the processor to implement remote NFC communication. The terminal may also serve as other secure elements besides the first secure element.

As shown in FIG. 6 or FIG. 7, in an embodiment of the present disclosure, the terminal may further include a control circuit and an NFC controller; the control circuit is connected to the processor; the control circuit is connected to the NFC controller; the control circuit is connected to the secure element interfaces; a first control switch and a second control switch are disposed on the control circuit; a first end of the first control switch is connected to a secure element interface connected to the first secure element, and a second end is connected to the NFC controller; a first end of the second control switch is connected to secure element interfaces connected to the other secure elements, and a second end is connected to the NFC controller; and the setting both the first secure element and the other secure elements to the normal working state includes: sending, by the processor, a control signal to the control circuit, setting the control switch between the first secure element and the NFC controller to the connected state, and setting the control switch between the other secure elements and the NFC controller to the connected state, so as to set the first secure element and the other secure elements to be in the normal working state, where the control signal is used to instruct the control circuit to switch on the control switch between the first secure element and the NFC controller and switch on the control switch between the other secure elements and the NFC controller. The terminal may set the secure element to be or not to be in the normal working state by using the control circuit. As mentioned above, among the three conditions for setting the secure element to be in the working state, that the control circuit is in the normally connected state is an implied condition for creating the logical channel between the processor and the NFC controller.

Optionally, as shown in FIG. 6, the NFC controller may be connected to the secure element interfaces in an SWP connection form. A control switch S1 and a control switch S2 are disposed on the control circuit. For example, a secure element interface connected to the control switch S1 is connected to the first secure element, and secure element interfaces connected to the control switch S2 are connected to the other secure elements. That is, after the first secure element is connected to a first secure element interface, an SWP connection between the first secure element and the NFC controller is controlled by the switch S1, and an SWP connection of a control circuit between the other secure elements and the NFC controller are controlled by the switch S2. When the identification information of the first secure element does not match the preset identification information, the processor sets both the first secure element and the other secure elements to the normal working state on a premise that control circuits between the first secure element and the other secure elements, and the processor, and control circuits between the first secure element and the other secure elements, and the NFC controller are in the normal connected state. Specifically, the processor sends a control signal to the control circuit, where the control signal is used to instruct the control circuit to switch on the control switch S1 between the first secure element and the NFC controller so as to set the control circuit between the first secure element and the NFC controller to the connected state; meanwhile, the control signal is further used to instruct the control circuit to switch on the control switch S2 between the other secure elements and the NFC controller so as to set the control circuit between the other secure elements and the NFC controller to the connected state. All secure elements connected to the secure element interfaces have an equal connection status, and all the secure elements may be further set to the normal working state by the processor.

Optionally, as shown in FIG. 7, a difference from the terminal shown in FIG. 6 lies in that the NFC controller and the secure element interfaces have a different connection form. The NFC controller may also be connected to the secure element interfaces in an NFC-WI connection form.

In an embodiment of the present disclosure, the terminal includes an NFC controller, where the NFC controller is connected to the processor, the NFC controller is connected to the secure element interfaces, and that the processor sets the other connected secure elements on the terminal to the non-normal working state includes at least one of the following implementation manners: The processor sends an instruction to the NFC controller to set the other secure elements to the disabled state; and the processor deletes routing information, stored in a routing table of the NFC controller, of applications installed on the other secure elements. Specifically, to set the secure element to be in the non-normal working state, in an example, the secure element is set to not meet one of the foregoing three conditions. Apparently, when none of the foregoing three conditions is met, or any two of the foregoing three conditions are not met, the secure element is still in the non-normal working state.

In an embodiment of the present disclosure, that the processor acquires the identification information of the first secure element includes that: the processor sends a query message to the first secure element, where the query message is used to query the identification information of the first secure element; and the processor receives an answer message sent by the first secure element, where the answer message includes the identification information of the first secure element.

In an embodiment of the present disclosure, the terminal further includes an NFC controller, the NFC controller is connected to the processor, the NFC controller is connected to the secure element interfaces, and that the processor acquires the identification information of the first secure element includes that: the processor sends a query message to the NFC controller, where the query message is used to query the identification information of the first secure element connected to the NFC controller; and the processor receives an answer message sent by the NFC controller, where the answer message includes the identification information of the first secure element. For example, the processor may send an NFCEE_DISCOVER_CMD to the NFC controller to request to query the identification information of the first secure element connected to the NFC controller. After receiving the NFCEE_DISCOVER_CMD, the NFC controller returns an NFCEE_DISCOVER_RSP to the processor, where the NFCEE_DISCOVER_RSP includes a quantity of secure elements connected to the NFC controller. The NFC controller sends an NFCEE_DISCOVER_NTF to the processor, where the NFCEE_DISCOVER_NTF may include the identification information of the first secure element connected to the NFC controller.

Figure 8:
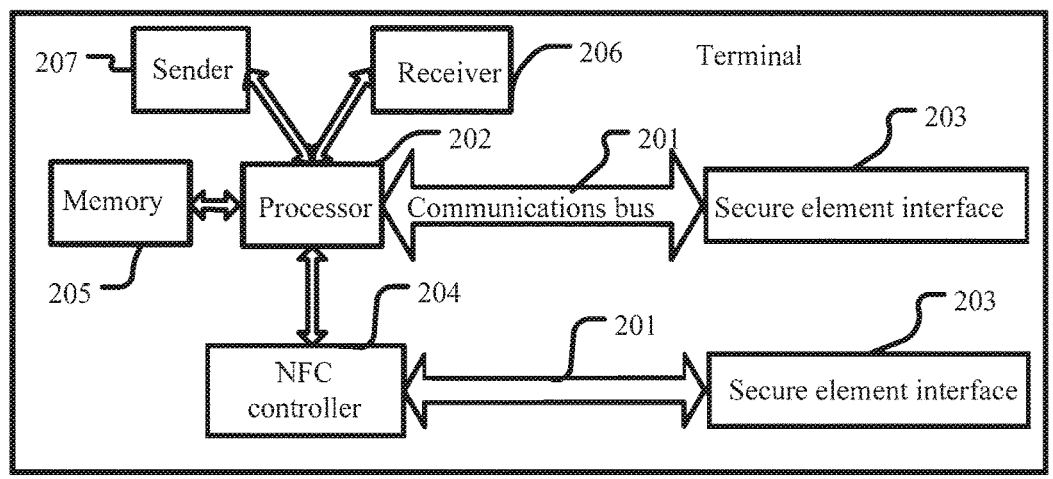
FIG. 8 is a schematic structural diagram of an embodiment of a terminal according to an embodiment of the present disclosure.

In an embodiment of the present disclosure, as shown in FIG. 8, the terminal may further include a sender 207, a receiver 206; the secure element interfaces include a UICC secure element interface, where the UICC secure element interface is configured to connect to a UICC-type secure element; the processor is further configured to generate a query request, where the query request is used to query identification information of the UICC-type secure element; the sender 207 is configured to send the query request to a server; the receiver 206 is configured to receive an answer message sent by the server, where the answer message includes the identification information of the UICC-type secure element; and that the processor 202 acquires the identification information of the first secure element includes that: the processor acquires the answer message, and acquires the identification information of the UICC-type secure element from the answer message. For example, the sender 207 may send the query request to a server of a UICC operator, so as to acquire the identification information of the UICC-type secure element.

Further, the preset identification information includes operator identification information and the owner identification information. That the processor matches the identification information of the first secure element with the preset identification information includes that: the processor matches operator identification information of the UICC-type secure element with the preset operator identification information; and the processor is further configured to match owner identification information of the UICC-type secure element with the preset owner identification information when the operator identification information of the UICC-type secure element matches the preset operator identification information.

In an embodiment of the present disclosure, the secure element interfaces 203 include a UICC secure element interface 203, where the UICC secure element interface 203 is configured to connect to a UICC-type secure element; the UICC-type secure element is installed on a UICC; and that the processor 202 acquires the identification information of the first secure element includes that: the processor 202 receives an ATR message sent by the UICC, and acquires identification information of the UICC-type secure element. For example, the processor receives an answer to reset (ATR defined by ISO 7816-3 and 7816-4) message sent by the UICC in response to cold reset (cold reset) or warm reset (warm reset), and acquires the identification information of the UICC-type secure element. An operator may set a format of an ATR answer for the UICC during initialization of the universal integrated circuit card (UICC), and writes owner information of a secure element supported by the card into an ATR message field.

Further, the preset identification information includes operator identification information and the owner identification information. That the processor 202 matches the identification information of the first secure element with the preset identification information includes that: the processor 202 matches operator identification information of the UICC-type secure element with the preset operator identification information; and the processor 202 is further configured to match owner identification information of the UICC-type secure element with the preset owner identification information when the operator identification information of the UICC-type secure element matches the preset operator identification information.

In the foregoing embodiment of the present disclosure, the processor is further configured to set the other secure elements to the normal working state when the identification information of the first secure element matches the preset identification information and the first secure element is removed. When the identification information of the first secure element matches the preset identification information, the first secure element is the exclusive secure element, and when the exclusive secure element is connected to the terminal, the terminal sets the exclusive secure element to the normal working state, and sets the other secure elements to the non-normal working state. When the exclusive secure element is removed, before a new exclusive secure element is connected, the terminal has no exclusive secure element; in this case, the processor may set the other secure elements to the normal working state, so as to ensure normal NFC communication of the terminal.

In the foregoing embodiment of the present disclosure, the terminal may be a computer system in a handheld form, such as a smart phone, a tablet personal computer, a personal digital assistant (PDA for short), a mobile Internet device (MID), a wearable device, or the like. A person killed in the art may understand that the structure of the foregoing terminal does not constitute a limitation on the terminal; the electronic device may include more or less parts than those shown in the drawings, some parts may be combined, or the parts may be arranged in a different way.

Method Embodiment Part

Method Embodiment 1

Figure 9:
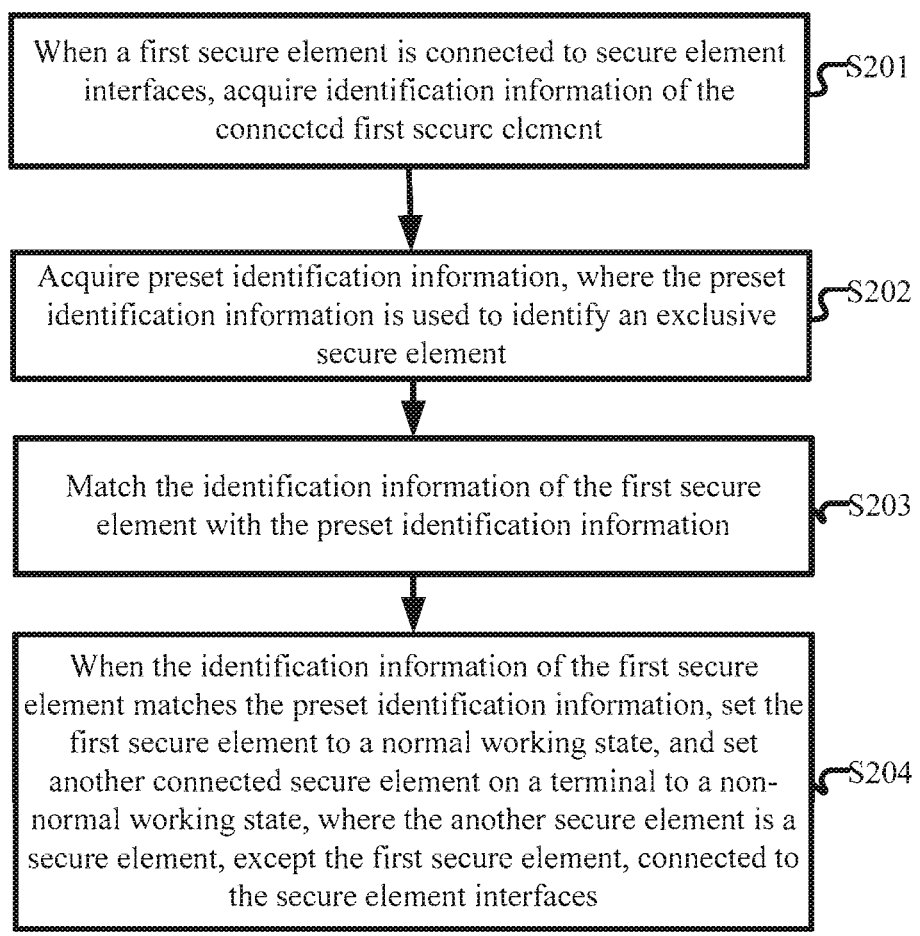
FIG. 9 is a schematic flowchart of an embodiment of a secure element management method according to an embodiment of the present disclosure.

Referring to FIG. 9, FIG. 9 is a schematic flowchart of a secure element management method according to an embodiment of the present disclosure. The method provided in this embodiment of the present disclosure is applied to a terminal that includes at least two secure element interfaces, and the method includes the following steps:

S201. When a first secure element is connected to the secure element interfaces, acquire identification information of the connected first secure element.

Specifically, the terminal may include at least two secure element interfaces. After the first secure element is connected to the secure element interface, the identification information of the first secure element is acquired. Optionally, the identification information of the first secure element may be owner identification information of the first secure element, where the owner identification information is used to identify an issuer of the secure element. For example, the first secure element may use an issuer ID or card issuer data included in an ATR, or VERSION_SW+VERSION_HW+VENDOR_NAME in an HCI as the owner identification information. When the first secure element is a UICC-type secure element, where the UICC-type secure element is a secure element supported by a universal integrated circuit card (UICC), the identification information of the first secure element further includes an ICCID of the UICC.

Optionally, after acquiring the identification information of the first secure element, the terminal may further acquire identification information of other secure elements connected to the terminal, where the other secure elements are secure elements connected to the secure element interfaces. Optionally, the terminal may run a secure element management program, generate a secure element configuration table, and maintain the secure element configuration table by using the secure element management program. The configuration table may include a current working status of a secure element, attribute information of whether the secure element is exclusive, identification information of the secure element, and the like.

S202. Acquire preset identification information, where the preset identification information is used to identify an exclusive secure element.

Specifically, identification information of the exclusive secure element is preset in the terminal, and a secure element corresponding to the preset identification information of the exclusive secure element is the exclusive secure element. The terminal acquires the preset identification information, where the preset identification information may be preset owner identification information of the exclusive secure element, and may further include identification information of an exclusive secure element operator.

S203. Match the identification information of the first secure element with the preset identification information.

Specifically, after the terminal acquires the identification information of the first secure element and the preset identification information, the terminal matches the identification information of the first secure element with the preset identification information of the exclusive secure element, and further determines whether the first secure element is the exclusive secure element.

Optionally, the performing, by the terminal, matching between the identification information of the first secure element and the preset identification information of the exclusive secure element may be matching the owner identification information of the first secure element with the preset owner identification information of the exclusive secure element.

Optionally, when the first secure element is a UICC-type secure element, the preset identification information includes operator identification information and the owner identification information. The matching the identification information of the first secure element with the preset identification information includes: matching operator identification information of the UICC-type secure element with the preset operator identification information; and matching owner identification information of the UICC-type secure element with the preset owner identification information when the operator identification information of the UICC-type secure element matches the preset operator identification information.

S204. When the identification information of the first secure element matches the preset identification information, set the first secure element to a normal working state, and set other connected secure elements on the terminal to a non-normal working state, where the other secure elements are secure elements connected to the secure element interfaces.

When the identification information of the first secure element matches the preset identification information of the exclusive secure element, the terminal determines that the first secure element is the exclusive secure element. Based on a feature of the exclusive secure element, the terminal sets the first secure element to the normal working state, and sets the other secure elements to the non-normal working state.

Specifically, f-r setting secure elements to be in the normal working state and the non-normal working state, reference may be made to a corresponding part of the hardware module apparatus embodiment part, and details are not described in this part again.

In this embodiment of the present disclosure, when a first secure element is connected to secure element interfaces, a terminal acquires identification information of the connected first secure element; acquires preset identification information, where the preset identification information is used to identify an exclusive secure element; matches the identification information of the first secure element with the preset identification information; and when the identification information of the first secure element matches the preset identification information, sets the first secure element to a normal working state, and sets other connected secure elements on the terminal to a non-normal working state. According to this embodiment of the present disclosure, the terminal supports a management mode of an exclusive secure element, a requirement of an exclusive secure element issuer for exclusively taking control of a secure element of the terminal is met, and payment efficiency of mobile payment is improved.

In an implementation manner of this embodiment of the present disclosure, the method further includes: setting both the first secure element and the other secure elements to the normal working state when the identification information of the first secure element does not match the preset identification information and identification information of the other secure elements does not match the preset identification information.

Optionally, that the identification information of the other secure elements does not match the preset identification information includes: acquiring the identification information of the other connected secure elements; matching the identification information of the other secure elements with the preset identification information; and determining that the identification information of the other secure elements does not match the preset identification information. The terminal may acquire the identification information of the other secure elements one by one, match the identification information of the other secure elements with the preset identification information one by one, and determine that the identification information of the other secure elements does not match the preset identification information.

Optionally, the terminal stores information about matching between identification information of secure elements connected to the secure element interfaces and the preset identification information; that the identification information of the other secure elements does not match the preset identification information includes: acquiring the information about matching between the identification information of the secure elements connected to the secure element interfaces and the preset identification information, and determining that the identification information of the other secure elements does not match the preset identification information. Before the first secure element is connected to the terminal, the terminal has acquired the identification information of the other secure elements connected to the terminal, matches the identification information of the other secure elements with the preset identification information, and stores a result of the matching. After the first secure element is connected to the terminal, the terminal invokes the result of the matching, and determines that the identification information of the other secure elements does not match the preset identification information.

In this implementation manner of this embodiment of the present disclosure, none of secure elements connected to the secure element interfaces is the exclusive secure element, all the secure elements are in an equal status, and the terminal supports collaborative working of multiple secure elements, and may be compatible with secure elements of multiple parties such as a mobile communications operator, a financial institution, a third-party mobile payment operator, which improves support efficiency of mobile payment.

In an implementation manner of this embodiment of the present disclosure, before the identification information of the connected first secure element is acquired, the method further includes: when the terminal detects that a quantity of secure elements connected to the at least two secure element interfaces changes, disabling NFC applications installed on all secure elements connected to the secure element interfaces. Specifically, before it is detected that the quantity of secure elements connected to the terminal changes, the terminal acquires related information of the secure elements connected to the terminal, and acquires information about related applications on the secure elements connected to the terminal. When it is detected that the number of secure elements changes, for example, it is detected that a UICC card or a MicroSD card is inserted into the terminal, the connected secure element is added to the terminal, and secure elements that have been connected to the terminal include the secure elements that have been previously connected to the terminal and the newly added connected secure element. That the terminal disables NFC communication related to all the connected secure elements includes: disabling activated applications on the previously-connected secure elements, and prohibiting activation of an application on the newly added connected secure element, so as to ensure that when the quantity of secure elements on the terminal changes, the terminal disables NFC applications on the secure elements. In this way, when a new secure element is connected to the terminal, an application related to the existing secure elements is disabled, detection efficiency of an exclusive secure element is improved, and further payment efficiency may be improved; and meanwhile, security of NFC communication of the terminal is also ensured.

In an embodiment of the present disclosure, the first secure element may be a secure element in a broad sense, for example, a terminal that supports android 4.4 host-based card emulation, that is, a host-based card emulation function. The terminal may be considered as the first secure element, and in this case, an application installed on the first secure element is an application installed on the terminal. The setting the first secure element to the normal working state includes: setting the first secure element to an enabled state; configuring routing information of an application installed on the first secure element into a routing table of an NFC controller; and configuring the routing information of the application installed on the first secure element into a routing table maintained by the processor. The processor maintains routing information of all applications that have been installed on the terminal; optionally, the routing information of all the installed application is stored on the terminal in a form of a routing table. The routing information stores an application identifier of an application installed on the terminal, where the application identifier is used to identify path information, and the path information may be information about a path, in which the application is installed, on the terminal. The terminal may also serve as other secure elements besides the first secure element.

In a possible implementation manner of this embodiment of the present disclosure, when only one secure element is connected to the terminal, the terminal acquires identification information of the secure element, acquires a preset identification information of an exclusive secure element, and matches the identification information of the only one secure element acquired with the preset identification information of the exclusive secure element. When the identification information of the only one secure element matches the preset identification information of the exclusive secure element, the only one secure element installed on the terminal is the exclusive secure element, and the terminal may set the only one secure element installed on the terminal to be in the normal working state; because only one secure element is installed on the terminal, the setting a secure element whose identification information does not match the identification information of the exclusive secure element to the non-normal working state may not be specifically performed in this implementation manner. When the identification information of the only one secure element is inconsistent with the preset identification information of the exclusive secure element, the only one secure element installed on the terminal is a non-exclusive secure element, the terminal has no exclusive secure element, and likewise, the terminal may set the only one secure element on the terminal to be in the normal working state, so as to ensure that the terminal may perform NFC communication. It should be noted that in a case in which only one secure element is installed on the terminal, although the terminal may not need to specifically perform steps of a method for setting other connected secure elements to the non-normal working state, in this application scenario, the terminal may still perform a procedure of acquiring identification information, a procedure of matching identification information, and a procedure of setting a working status of a secure element that are corresponding to the method. In other words, in a case in which only one secure element is connected to the at least two secure element interfaces of the terminal, the terminal may still perform the steps of the method in this embodiment of the present disclosure, and the performing, by the terminal, the steps of the method in this embodiment of the present disclosure shall fall within the protection scope of this embodiment of the present disclosure.

Method Embodiment 2

Figure 10:
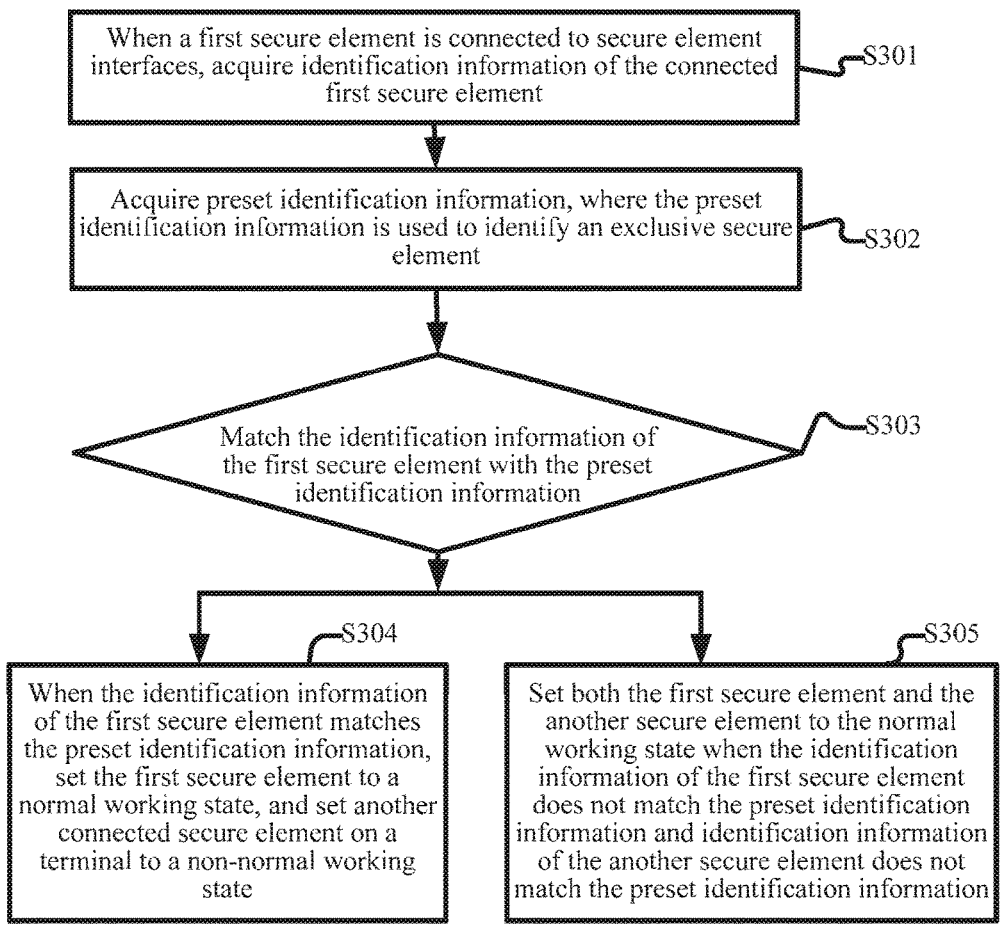
FIG. 10 is a schematic flowchart of an embodiment of a secure element management method according to an embodiment of the present disclosure.

In an embodiment of the present disclosure, when a first secure element is connected to secure element interfaces of a terminal, the terminal may acquire identification information of the first secure element by using a management entity (ME), and further match the identification information of the first secure element with preset identification information of an exclusive secure element, that is, the terminal may implement identification and management of the exclusive secure element by using the management entity. It has been mentioned in Background that the ME is a logical entity that is defined in a requirement document of Global Platform multiple secure elements management solutions and used to manage multiple secure elements exist on a same terminal, and may be implemented in a software or hardware manner. For example, the management entity may be a software entity, on an NFC controller or a processor (Device Host, DH), used to manage multiple secure elements on the terminal and applications on the multiple secure elements, may be a component or a chip integrated into an electronic device, or may be an independent electronic device. It should be noted that this embodiment of the present disclosure is a specific implementation manner of the technical solutions in Method Embodiment 1. In this embodiment of the present disclosure, there are steps the same as or similar to the technical solutions in other embodiments, and technical features in the same or similar steps may be learned from each other. As shown in FIG. 10, the method includes the following steps:

S301. When a first secure element is connected to the secure element interfaces, acquire identification information of the connected first secure element.

The terminal may acquire the identification information of the first secure element by using the management entity. The acquiring identification information of the first secure element includes: sending, by the terminal, a query message to the first secure element, where the query message is used to query the identification information of the first secure element; and receiving, by the terminal, an answer message sent by the first secure element, where the answer message includes the identification information of the first secure element.

Optionally, the terminal may run a secure element management program. A processor of the terminal sends a query instruction to the management entity, where the query instruction is used to request to query identification information of a secure element connected to the management entity. The query message sent by the management entity to the first secure element includes an application protocol data unit (APDU) command. The APDU herein is a group of commands that are defined in ISO 7816-4 and used for performing, by a smartcard, half-duplex communication with a card reader, and these commands are encapsulated into an APDU format. A security domain of the first secure element is queried, and the identification information of the first secure element is acquired from the security domain, where the identification information may be owner identification information. For example, when the first secure element is a UICC-type secure element, the ME sends a select financial certification security domain (FCSD) instruction to the UICC-type secure element, and interacts with the FCSD) to obtain a PAMID of the UICC-type secure element, for example, reads (read) or acquires (get) the PAMID of the secure element. The PAMID of the UICC-type secure element may include issuer information (issuer ID) of the secure element, a type of the secure element, and a unique serial number of the secure element. The terminal acquires a PAMID of the first secure element and other information.

Optionally, the terminal may also send a query message to the first secure element by using the management entity, where the query message is used to query the identification information of the first secure element; and the management entity receives an answer message sent by the first secure element, where the answer message includes the identification information of the first secure element. The terminal acquires the identification information of the first secure element.

S302. Acquire preset identification information, where the preset identification information is used to identify an exclusive secure element.

S303. Match the identification information of the first secure element with the preset identification information.

Specifically, the terminal may match the PAMID) of the first secure element with preset issuer information of the exclusive secure element. For example, the terminal may run the secure element management program to perform matching. When the terminal detects that the PAMID of the first secure element matches the preset issuer information of the exclusive secure element, the first secure element is the exclusive secure element, and in this case, step S304 is performed. When the terminal detects that the PAMID of the first secure element does not match the preset issuer information of the exclusive secure element, the first secure element is not the exclusive secure element, and in this case, step S305 is performed.

S304. When the identification information of the first secure element matches the preset identification information, set the first secure element to a normal working state, and set other connected secure elements on the terminal to a non-normal working state, where the other secure elements are secure elements connected to the secure element interfaces.

Specifically, when the terminal detects that the identification information of the first secure element matches the preset identification information of the exclusive secure element, for example, the PAMID of the first secure element matches the preset issuer information of the exclusive secure element, the first secure element is the exclusive secure element, and the terminal sets the first secure element to the normal working state. In the at least two secure element interfaces of the terminal, when secure elements are connected also to other secure element interfaces, for example other than a secure element interface connected to the first secure element, in the at least two secure element interfaces, the terminal sets the secure elements connected to the other secure element interfaces to the non-normal working state.

When setting the first secure element to be in the normal working state, the terminal may mark the secure element, for example, set "exclusive attribute or not" of the first secure element to yes, and set "exclusive attribute or not" of the other secure elements to no, and further set the secure element to be or not to be in the normal working state according to the mark. For setting, by the terminal, secure elements to be in the normal working state and the non-normal working state, reference may be made to corresponding technical features in embodiments of the present disclosure, and details are not described herein again.

S305. Set both the first secure element and the other secure elements to the normal working state when the identification information of the first secure element does not match the preset identification information and identification information of the other secure elements does not match the preset identification information.

Specifically, when the identification information of the first secure element does not match the preset identification information and the identification information of the other secure elements does not match the preset identification information, for example, PAMIDs of all secure elements are inconsistent with the preset issuer information of the exclusive secure element, the terminal has no exclusive secure element, and the terminal sets all secure elements that have been connected to the secure element interfaces to the normal working state.

In the foregoing implementation manner of this embodiment of the present disclosure, when a secure element is in the normal working state, a data transmission link between an NFC controller and the secure element that is in a normal working state is established, and an entry of an application related to the secure element with which the NFC controller has established the data transmission link is configured into routing information of the NFC controller.

Specifically, the secure element is set to be in the normal working state; when configuring the routing information of the secure element, the processor of the terminal may send an RF_SET_LISTEN_MODE_ROUTING_TABLE_CMD to the NFC controller to set the routing information. After successfully setting the routing information, the terminal may lock modification permissions of the routing information of the NFC controller and configuration information of the secure element until a procedure of detecting the exclusive secure element is started next time.

In an implementation manner of this embodiment of the present disclosure, before the identification information of the connected first secure element is acquired, the method further includes: when the terminal detects that a quantity of secure elements connected to the at least two secure element interfaces changes, disabling NFC applications installed on all secure elements connected to the secure element interfaces. Specifically, the management entity may close logical channels between the management entity and all the secure elements, and disable the NFC applications installed on all the secure elements connected to the secure element interfaces. After disabling the NFC applications related to all the secure elements, the terminal enables a procedure of discovering an exclusive secure element. In a process of discovering an exclusive secure element, a list of secure elements that have been installed on the terminal and current statuses of the secure elements may be acquired by using an NFCEE discovery mechanism defined by the NFC Forum NCI Spec. For example, the processor may send an NFCEE_DISCOVER_CMD to the NFC controller to request to query information about secure elements connected to the NFC controller. After receiving the NFCEE_DISCOVER_CMD sent by the processor, the NFC controller sends an NFCEE_DISCOVER_RSP to the processor to notify the processor of a quantity of secure elements connected to the NFC controller. The NFC controller may further send NFCEE_DISCOVER_NTFs to the processor one by one to notify the processor of related information of the secure elements connected to the NFC controller, for example, current statuses of the secure elements. A quantity of NFCEE_DISCOVER_NTFs sent by the NFC controller to the processor depends on the quantity of secure elements connected to the NFC controller, and the NFCEE_DISCOVER_NTFs may include an NFCEE ID, so as to indicate that the NFCEE_DISCOVER_NTFs instruction reports only related information of the secure elements. After receiving the NFCEE_DISCOVER_RSP sent by the NFC controller, the processor learns the quantity of secure elements connected to the NFC controller; and after receiving, one by one, the NFCEE_DISCOVER_NTFs, sent by the NFC controller, the processor learns the related information of the secure elements connected to the NFC controller. The processor may send the acquired related information of the secure elements to the management entity, and the management entity acquires the related information of the secure elements.

Method Embodiment 3

Figure 11:
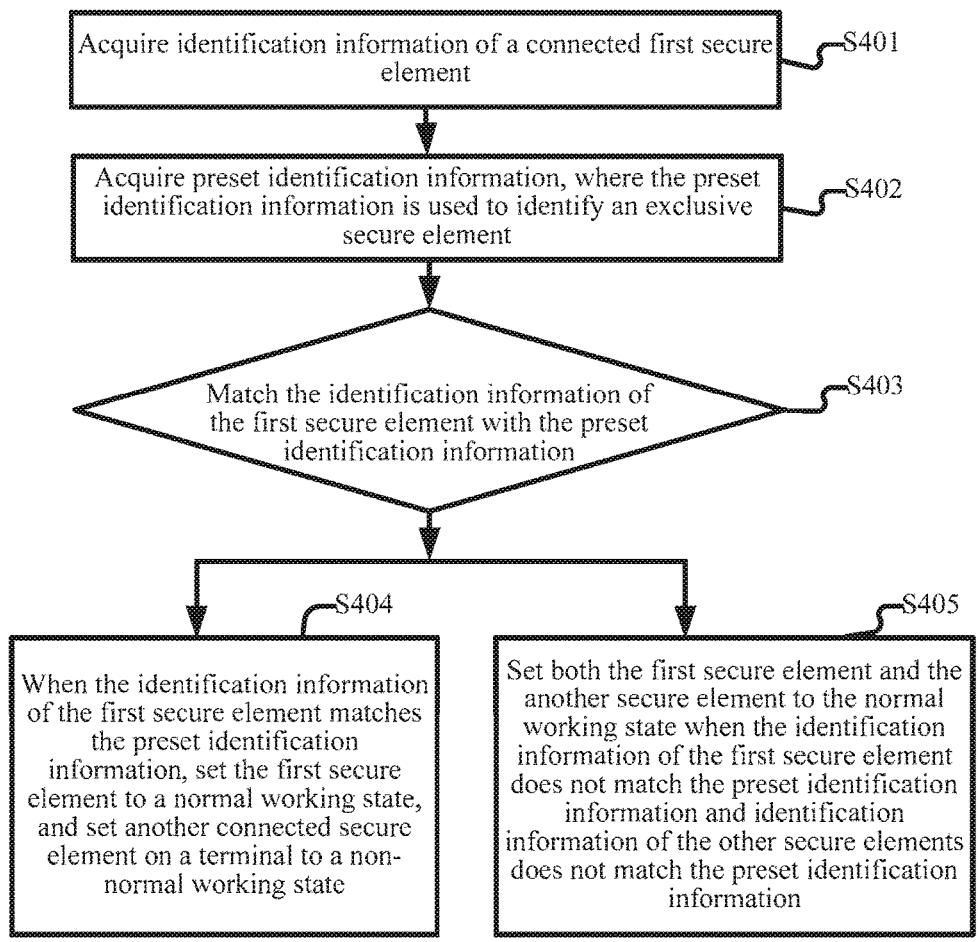
FIG. 11 is a schematic flowchart of an embodiment of a secure element management method according to an embodiment of the present disclosure.

In an embodiment of the present disclosure, a terminal may detect, based on a secure element discovery mechanism of the NFC Forum NFC Controller Interface specification (NCI Spec), whether a first secure element is an exclusive secure element, where the NFC Forum NCI Spec is one of core standards formulated by the NFC Forum organization. In a mobile payment architecture of the terminal, to correctly configure routing information of an NFC controller, a processor needs to acquire configuration information of each secure element connected to the NFC controller, where the configuration information includes issuer description information of the secure element. The issuer description information is a description of an issuer of the secure element, for example, an operator of the secure element, a body that manages the secure element, where the information may be used to indicate whether the secure element belongs to a particular operator. After acquiring the issuer description information of the secure element, the terminal may determine, according to issuer information, whether the secure element is exclusive, and further determine a working status of the secure element according to a corresponding instruction, for example, after exclusiveness of the secure element is determined according to the issuer information of the secure element, an NFCEE_SE T_MODE_CMD may be used to enable or disable a corresponding secure element. It should be noted that this embodiment of the present disclosure is a specific implementation manner of the technical solutions in Method Embodiment 1. In this embodiment of the present disclosure, there are steps the same as or similar to the technical solutions in other embodiments, and technical features in the same or similar steps may be learned from each other. When a first secure element is connected to the secure element interfaces, as shown in FIG. 11, a specific implementation process of this embodiment of the present disclosure may include the following steps:

S401. Acquire identification information of the connected first secure element.

Specifically, the terminal may include an NFC controller, where the NFC controller is connected to the secure element interfaces. The acquiring identification information of the first secure element includes: sending, by a processor of the terminal, a query message to the NFC controller, where the query message is used to query the identification information of the first secure element connected to the NFC controller; and receiving, by the processor of the terminal, an answer message sent by the NFC controller, where the answer message includes the identification information of the first secure element. When the first secure element is connected, the processor may acquire the identification information of the first secure element connected to the NFC controller. The identification information, acquired by the processor, of the secure element may include owner identification information and a secure element ID (NFCEE ID) of the secure element. The owner identification information of the secure element is issuer description information of the secure element, which may include a vendor of the secure element, a model of the secure element, and the like; the secure element ID is identification information of the secure element for the terminal. Optionally, the processor may send a query instruction to the NFC controller to query information about the first secure element connected to the NFC controller. After receiving the query instruction sent by the processor, the NFC controller sends answer information to the processor. For example, the processor may send an NFCEE_DISCOVER_CMD to the NFC controller to request to query the identification information of the first secure element connected to the NFC controller. After receiving the NFCEE_DISCOVER_CMD, the NFC controller returns an NFCEE_DISCOVER_RSP to the processor, where the NFCEE_DISCOVER_RSP includes a quantity of secure elements connected to the NFC controller. The NFC controller may send an NFCEE_DISCOVER_NTF to the processor, where the NFCEE_DISCOVER_NTF includes specific configuration information of the secure element connected to the NFC controller. Each secure element connected to the NFC controller needs to bear, by using an independent NFCEE_DISCOVER_NTF, description information related to the secure element, for example, the NFC controller is connected to three secure elements, then the processor receives three NFCEE_DISCOVER_NTFs related to the three secure elements, and the processor separately receives the NFCEE_DISCOVER_NTFs, and separately acquires configuration information of the three secure elements. The processor acquires the identification information of the first secure element, that is, the processor may acquire the identification information of the first secure element by receiving one NFCEE_DISCOVER_NTF sent by the NFC controller.

Optionally, after acquiring configuration information of the first secure element, the processor may update configuration information of a secure element stored in the terminal. When the first secure element is a secure element newly connected to the terminal, the terminal may create configuration information of the secure element for the newly-discovered secure element, where the configuration information may include owner identification information of the secure element, an ID (or a temporary ID)) of the secure element, and a related status of the secure element, such as a secure element Status. When the first secure element is a secure element that has been connected to the terminal previously, the terminal may acquire updated configuration information related to the first secure element, and replaces previous configuration information of the secure element with the updated configuration information related to the first secure element. Further, the terminal may construct a secure element configuration table. The secure element configuration table may include related information of all the secure elements that have been connected to the terminal, for example, owner identification information of all secure elements and current statuses of all the secure elements. An entry may be created for each secure element in the secure element configuration table, where each entry includes owner identification information of the secure element, a secure element ID (NFCEE ID, or a temporary ID assigned by the processor), and Status information of the secure element, where the temporary ID is assigned to a secure element that is connected to the NFC controller in an SWP/HCI manner.

Optionally, when the terminal stores related configuration information of multiple secure elements, but a secure element is not detected when detection is performed, the terminal may further detect whether the secure element is removed (Removed). That the secure element is removed may refer to that a physical carrier of the secure element is removed from the terminal, for example, a secure element is loaded onto a secure digital (SD) card or a subscriber identity module (SIM) card, and when the SD card or the SIM card is removed, the secure element on the SD card or the SIM card is Removed. When the terminal determines that the secure element is Removed, the terminal may delete related configuration information and routing information of the secure element.

When managing related information, acquired by the terminal, of the first secure element, such as the identification information, for security considerations, the terminal may manage, by using a special account similar to an account with a super permission, the configuration information of the first secure element connected to the NFC controller, and routing information, in a routing table of the NFC controller, of the first secure element.

Further, the processor receives the answer message sent by the NFC controller, and when a protocol type of the answer message received by the processor is HCI Access, for example, a protocol type of an NFCEE_DISCOVER_NTF is HCI Access, the processor may acquire identification information of an issuer of the secure element by using a corresponding command, for example, obtain Vendor information of each Gate by using an HCI command ANY_GET_PAMAMETER.

S402. Acquire preset identification information, where the preset identification information is used to identify an exclusive secure element.

Identification information of the exclusive secure element is preset in the terminal, for example, owner identification information of the exclusive secure element or other data that may be used to identify an issuer identity of the exclusive secure element, such as Vendor Name+Vendor_HARD+Vendor_SW. After acquiring the preset identification information of the exclusive secure element, step S403 is performed.

When the preset identification information of the exclusive secure element is not preset in the terminal, it may be determined that the terminal has not specified the exclusive secure element. When the terminal currently includes two or more secure elements, the secure elements are in an equal status, and in this case, the terminal sets the first secure element and the other secure elements to a normal working state.

S403. Match the identification information of the first secure element with the preset identification information.

Specifically, the terminal may match the owner identification information of the first secure element with the preset owner identification information of the exclusive secure element, for example, the terminal may run a secure element management program to perform matching. When the terminal detects that the owner identification information of the first secure element matches the preset owner identification information of the exclusive secure element, that is, there is an exclusive secure element on the terminal, in this case, step S404 is performed. When the terminal detects that the owner identification information of the first secure element does not match the preset owner identification information of the exclusive secure element, in this case, step S405 is performed.

Optionally, when the terminal detects that the owner identification information of the first secure element matches the preset owner identification information of the exclusive secure element, the terminal may set a discovery mark of the exclusive secure element in the secure element configuration table, and record a secure element ID or a temporary ID of the exclusive secure element, so as to determine that the exclusive secure element is installed on the terminal. The discovery mark of the exclusive secure element may be a global variable, a record in a txt file, or a field in an xml file, which is not limited in this embodiment of the present disclosure.

S404. When the identification information of the first secure element matches the preset identification information, set the first secure element to a normal working state, and set other connected secure elements on the terminal to a non-normal working state, where the other secure elements are secure elements connected to the secure element interfaces.

Specifically, when the terminal detects that the owner identification information of the first secure element matches the preset owner identification information of the exclusive secure element, the terminal determines that the first secure element is an exclusive secure element connected to the terminal, and the terminal sets the first secure element to the normal working state. When other secure elements are connected to the secure element interfaces of the terminal, the terminal sets the other secure elements to the non-normal working state. For example, the terminal may set the other secure elements to a disabled state, and a specific disabling manner may be that the processor sends a Disable instruction to the secure elements.

S405. The terminal sets both the first secure element and the other secure elements to the normal working state when the identification information of the first secure element does not match the preset identification information and identification information of the other secure elements does not match the preset identification information.

Specifically, when identification information of an exclusive secure element is not preset in the terminal, no exclusive secure element is preset in the terminal, that is, there is no preset exclusive secure element on the terminal. In this case, the terminal sets both the first secure element and the other secure elements to the normal working state, and the connected secure elements can work normally.

Specifically, when the identification information of the first secure element does not match the preset identification information, and the identification information of the other secure elements does not match the preset identification information, that is, there is no preset exclusive secure element in the secure elements connected to the secure element interfaces of the terminal, the terminal may also set both the first secure element and the other secure elements to the normal working state, and the connected secure elements can all work normally.

Further, the terminal may enable or disable, according to a default setting of a system or user selection, any secure element of all secure elements connected to the terminal. Specifically, the processor sends an NFCEE_MODE_SET_CMD to a secure element according to an NFCEE ID to request to enable or disable the secure element corresponding to the NFCEE ID. The processor may receive an answer, for example, an NFCEE_MODE_SET_RSP, from the secure element, so as to determine whether the secure element enters the normal working state. After learning whether the secure element enters the normal working state, the processor may update a current status (Status) of the secure element in configuration information of the secure element of the terminal.

In the foregoing implementation manner of this embodiment of the present disclosure, the terminal may acquire a working status of a connected secure element. The processor may set, by using a corresponding instruction, for example, an RF_SET_LISTEN_MODE_ROUTING_CMD, routing information of the secure element according to the working status (Status) of the secure element. The terminal may run, by using a special account, a secure element management program to implement a setting of the routing information, where the special account is similar to an account with a "super permission". After the terminal implements the setting of the routing information of the secure element, the terminal may lock a modification permission of the configuration information and the routing information of the secure element. The terminal enters a normal working state of NFC communication.

Method Embodiment 4

Figure 12:
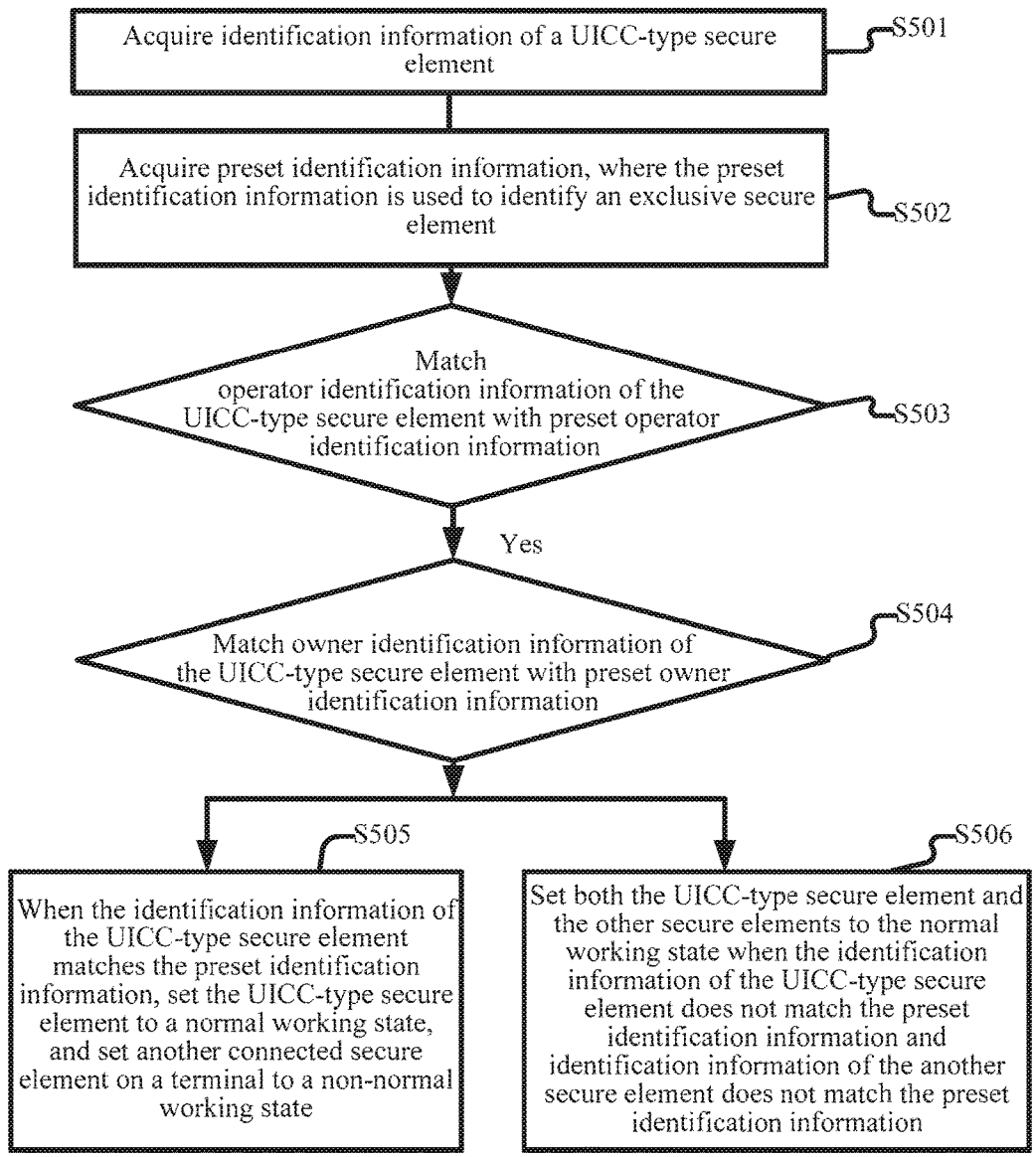
FIG. 12 is a schematic flowchart of an embodiment of a secure element management method according to an embodiment of the present disclosure.

In an embodiment of the present disclosure, when a secure element connected to secure element interfaces of the terminal is a secure element provided by an operator, the terminal may further acquire, by using a server of the operator or a universal integrated circuit card (UICC), information about the secure element provided by the operator, and use identification information of the secure element provided by the operator to detect whether the secure element provided by the operator is an exclusive secure element. The secure element provided by the operator may be a secure element supported by the universal integrated circuit card (UICC). The UICC is a generic term of a smartcard that defines a physical feature, is a mobile smartcard, and is used to store information such as user information, an authentication key, a telephone book, and a short message service message. A physical entity of the UICC may be a SIM card, a UISM card, a UIM card, or the like that are issued by an operator. The UICC may include multiple logical applications, such as a subscriber identity module (SIM, Subscriber Identity Module), a universal subscriber identity module (USIM), and an IP multimedia services identity module (ISIM), and may further include another application (for example, eWallet). Currently, the UICC card generally includes two modules; the USIM and the SIM; in this case, the UICC card is referred to as a composite USIM card (it can be compatible with a GSM terminal and a WCDMA terminal); and if the UICC includes only a USIM module, the UICC is referred to as a pure USIM card. It should be noted that this embodiment of the present disclosure is a specific implementation manner of the technical solutions in Method Embodiment 1. In this embodiment of the present disclosure, there are steps the same as or similar to the technical solutions in Embodiment 1, and technical features in the same or similar steps may be learned from each other. In this embodiment of the present disclosure, by using an example in which the first secure element is a UICC-type secure element, as shown in FIG. 12, when a UICC-type secure element is connected to the secure element interfaces, the following steps may specifically be included:

S501. Acquire identification information of the UICC-type secure element.

Specifically, the UICC-type secure element is a secure element supported by a UICC, for example, a secure element supported by a SIM card, a USIM card, or a user identify module (UIM) card that is issued by an operator. The terminal may acquire operator information of the UICC. When the terminal detects that a UICC is loaded onto the terminal, the terminal reads an integrated circuit card identity (ICCID) of the UICC, and acquires the operator information of the UICC, for example, determines whether the operator is China Unicorn, China Mobile, or China Telecom. The identification information of the UICC-type secure element may be owner information of the secure element supported by the UICC.

Optionally, the acquiring identification information of the UICC-type secure element includes: sending, by the terminal, a query request to a server, where the query request is used to query the identification information of the UICC-type secure element; and receiving, by the terminal, an answer message sent by the server, where the answer message includes the identification information of the UICC-type secure element. The terminal may send the query request to the server of the UICC operator, where the query request is used to query whether the UICC supports a secure element, and when the UICC supports the secure element, identification information of the secure element supported by the UICC is acquired, where a form of the request may be a short message service message or a data connection request. The server of the operator may determine, according to the ICCID of the UICC, whether the UICC supports the secure element, and send a result of the determining to the terminal. When the server determines that the UICC supports the secure element, the server sends an issuer ID and/or issuer definition data of the secure element supported by the UICC to the terminal. The terminal receives the answer message sent by the server, and acquires owner identification information of the UICC-type secure element.

Optionally, the acquiring identification information of the UICC-type secure element includes: receiving, by the terminal, an answer to reset (ATR) message sent by the UICC, and acquiring the identification information of the UICC-type secure element. The terminal may also directly acquire, by using the UICC, the identification information of the secure element supported by the UICC. The terminal receives an ATR message sent by the UICC in response to cold reset (cold reset) or warm reset (warm reset), and acquires the identification information of the UICC-type secure element. The operator may set a format of an answer to reset (ATR, a message defined by ISO 7816-3 and 7816-4) message of the UICC during initialization of the universal integrated circuit card (UICC), and writes owner information of the secure element supported by the card into an ATR message field. When the UICC card is inserted into a card slot and the terminal is powered on and starts, a card slot circuit of the terminal sends an electrical signal to the UICC, where the electrical signal includes cold reset (cold reset) and warm reset (warm reset) (for details, refer to a definition of standards ISO 7816-3 and 7816-4). After detecting the electrical signal, the UICC enters an initialization state, encapsulates related communication parameters into an Answer-To-Ret message, and sends the Answer-To-Ret message to the terminal; and the terminal acquires the identification information of the UICC-type secure element by using the ATR message. For example, the processor acquires card issuer data and/or an Issuer ID in Historical bytes, where the Historical bytes are a field in an ATR command. The terminal acquires, from at least one of the card issuer data and the Issuer ID, identification information such as owner identification information of the secure element supported by the UICC.

S502. Acquire preset identification information, where the preset identification information is used to identify an exclusive secure element.

Specifically, the preset identification information may include operator identification information ICCID, owner identification information of the exclusive secure element, and the like.

S503. Match operator identification information of the UICC-type secure element with preset operator identification information.

Specifically, when the terminal acquires the operator identification information of the UICC-type secure element and acquires the preset operator identification information, the terminal may match the operator identification information of the UICC with the preset operator identification information. The terminal may specifically perform a matching action by means of running, by the processor, a secure element management program. When the terminal determines that the operator identification information of the UICC is consistent with the preset operator identification information, step S504 is performed. It should be noted that, in an embodiment, this step is an optional step prior to "match owner identification information of the UICC-type secure element with the preset owner identification information of the exclusive secure element" in this embodiment of the present disclosure, and is not a step that must be performed in this embodiment of the present disclosure. In an example, when the operator identification information of the UICC is consistent with the preset operator identification information, the UICC-type secure element is the exclusive secure element; and when the operator identification information of the UICC is inconsistent with the preset operator identification information, the UICC-type secure element is not the exclusive secure element, and in this case, both the UICC-type secure element and the other secure elements are set to a normal working state. In an implementation manner of this embodiment of the present disclosure, by performing an action of matching the operator identification information of the UICC with the preset operator identification information, identification efficiency of the exclusive secure element is improved.

S504. Match owner identification information of the UICC-type secure element with the preset owner identification information when the operator identification information of the UICC-type secure element matches the preset operator identification information.

Specifically, the terminal may match the owner identification information of the UICC-type secure element with the preset owner identification information of the exclusive secure element. When the owner identification information of the UICC-type secure element is consistent with the preset owner identification information of the exclusive secure element, the terminal determines that the UICC-type secure element is the exclusive secure element, and an execution step of running the exclusive secure element connected the terminal is performed subsequently, for example, step S505 is performed; and when the owner identification information of the UICC-type secure element is inconsistent with the preset owner identification information of the exclusive secure element, the terminal determines that the UICC-type secure element is not the exclusive secure element, and an execution step of running all secure elements connected to the terminal may be performed, for example, step S506 is performed.

S505. When the identification information of the UICC-type secure element matches the preset identification information, set the UICC-type secure element to a normal working state, and set other connected secure elements on the terminal to a non-normal working state, where the other secure elements and the UICC-type secure element are secure elements connected to the secure element interfaces.

Specifically, when the owner identification information of the UICC-type secure element is consistent with the preset owner identification information of the exclusive secure element, the terminal determines that the UICC-type secure element is the exclusive secure element. The terminal may connect a control circuit between the UICC-type secure element and an NFC controller, for example, the terminal may connect an SWP interface of the NFC controller to a C6 pin of the UICC, so that the control circuit between the NFC controller and the UICC-type secure element is normally connected, and the UICC-type secure element may be further set to be in the normal working state.

When two or more secure elements are connected to the terminal, and one of them is the UICC-type secure element, at the same time when the terminal sets the UICC-type secure element to be in the normal working state, in an example, the terminal further sets other secure elements connected to the secure element interfaces of the terminal to be in the non-normal working state, that is, only the UICC-type secure element is in the normal working state, and the other secure elements connected to the terminal cannot work normally. The setting the other secure elements connected to the terminal to be in the non-normal working state may be implemented by disconnecting a control circuit between the secure elements and the NFC controller. For example, the UICC-type secure element may be connected to the NFC controller in a manner of an SWP or HCI interface, and the terminal may disable an NFC-WI interface, so that a hardware circuit between the NFC controller and other secure elements that have been connected to the terminal by using an NFC-WI is in a disconnected state; if multiple secure elements are connected to the NFC controller by using SWP, the terminal may connect the SWP interface of the NFC controller only to the C6 pin of the UICC, so that the control circuit between the NFC controller and the UICC-type secure element is in a connected state, and a control circuit between the NFC controller and an SWP interface of the other secure elements is disconnected. By setting a connection status of a control circuit between the secure element and the NFC controller, the terminal further sets a secure element connected to the terminal to be or not to be in the normal working state.

S506. Set both the UICC-type secure element and the other secure elements to the normal working state when the identification information of the UICC-type secure element does not match the preset identification information and identification information of the other secure elements does not match the preset identification information.

Specifically, when the owner identification information of the UICC-type secure element is inconsistent with the preset owner identification information of the exclusive secure element, the terminal determines that the UICC-type secure element is not the exclusive secure element, and the terminal may set all the connected secure elements to be in an equal status, and set all the connected secure elements to be in the normal working state. For example, the terminal may connect a hardware circuit between all the connected secure elements and the NFC controller, for example, set the NFC-WI interface to a Wired or Virtual state, connect the SWP interface of the NFC controller to each secure element that has an SWP interface, so as to ensure that a control circuit between all the secure elements and the NFC controller is in the connected state, so that all the connected secure elements are in the normal working state.

Method Embodiment 5

In an embodiment of the present disclosure, a terminal may set a secure element to be or not to be in a normal working state by using a control circuit. As mentioned above, among the three conditions for setting the secure element to be in the working state, that the control circuit is in the normal working state is an implied condition for creating a logical channel between a processor and an NFC controller. In this embodiment of the present disclosure, as shown in FIG. 6, a secure element interface corresponding to an S1 control switch of the control circuit of the terminal may be a preset card slot, where a control circuit is disposed between the preset card slot and the NFC controller, and the preset card slot is connected to a first secure element. It should be noted that this embodiment of the present disclosure is a specific implementation manner of the technical solutions in Embodiment 1. In this embodiment of the present disclosure, there are steps the same as or similar to the technical solutions in other embodiments, and technical features in the same or similar steps may be learned from each other.

Optionally, as shown in FIG. 6, the NFC controller may be connected to the preset card slot in an SWP connection form. A switch S1 is disposed between the preset card slot and an SWP connection interface of the NFC controller, and a switch S2 is disposed between other secure element interfaces, and the SWP connection of the NFC controller. That is, except for the preset card slot and the SWP connection of the NFC controller that are controlled by the switch S1, all the other secure element interfaces and the SWP connection of the control circuit of the NFC controller are controlled by the switch S2. When the terminal detects that hardware is connected to the preset card slot, the processor detects whether identification information of the secure element connected to the preset card slot is consistent with identification information, preset in the terminal, of an exclusive secure element. When the terminal finds, by means of detection, that the secure element on the preset card slot is the exclusive secure element, the processor sends a control signal to the control circuit, and after receiving the control signal, the control circuit closes the switch S1 and opens the switch S2, so that the terminal ensures, by controlling a connection relationship of the control circuit, that only the secure element on the preset card slot is available; if the identification information of the secure element connected to the preset card slot is inconsistent with the preset identification information of the exclusive secure element, the processor sends a control signal to the control circuit, and after receiving the control signal, the control circuit closes both the switch S1 and the switch S2, so as to ensure that all secure elements connected to the secure element interfaces of the terminal are in a state of normally connected to the NFC controller. All the secure elements have an equal connection status, and may be set to the normal working state.

Optionally, as shown in FIG. 7, the NFC controller may be connected to the preset card slot in an NFC-WI connection form. Detection and execution actions of the NFC-WI connection form are similar to those of the foregoing SWP connection form, and details are not described herein again.

Figure 13:
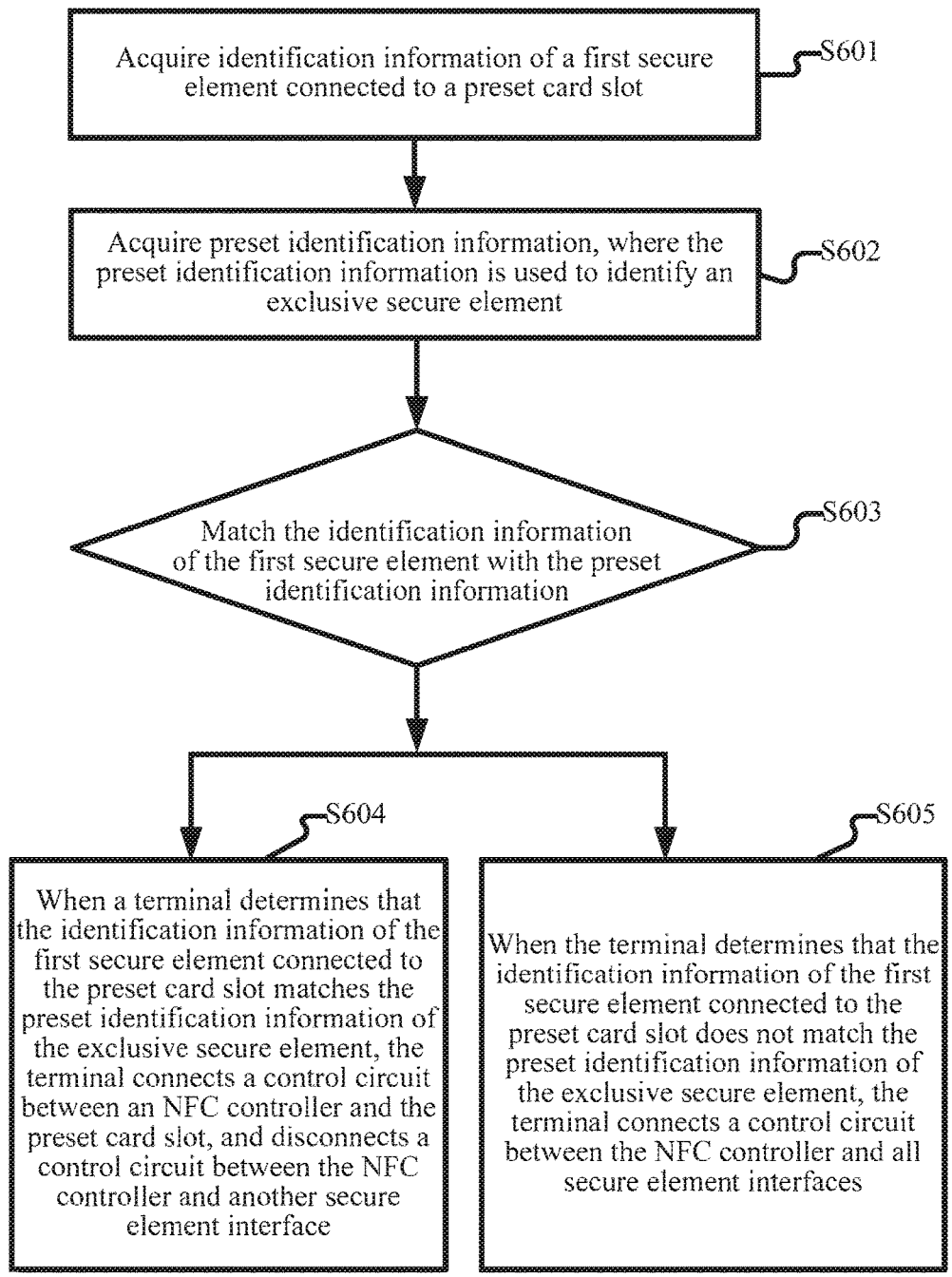
FIG. 13 is a schematic flowchart of an embodiment of a secure element management method according to an embodiment of the present disclosure.

As shown in FIG. 13, a specific implementation process of the method may include the following steps:

S601. Acquire identification information of a first secure element connected to the preset card slot.

Specifically, the terminal has the preset card slot, where there is an independent control circuit connection relationship between the preset card slot and the NFC controller. The preset card slot may be a UICC card slot, or may be a TF card slot. The connection form may an SWP form, or may be an NFC-WI form. There is an independent control switch on the control circuit between the preset card slot and the NFC controller, where the control switch is used to control circuit connection between the preset card slot and the NFC controller. In addition to being connected to the preset card slot, the NFC controller is further connected to other secure element interfaces, and a control circuit connection between the other secure element interfaces and the NFC controller shares a same control switch.

Optionally, after the terminal starts, the terminal detects whether hardware is inserted into the preset card slot. When the terminal detects that the hardware is connected to the preset card slot, the terminal closes a connection control switch between the NFC controller and the preset card slot, and opens a connection control switch between the NFC controller and the other secure element interfaces. For example, when the preset card slot is a UICC card slot, and the terminal detects that a UICC is connected to the preset card slot, the processor sends a control signal to the control circuit, so as to close the connection control switch between the NFC controller and the preset card slot, and open the connection control switch between the NFC controller and the other secure element interfaces.

Specifically, the processor of the terminal may send an information query request to the first secure element on the preset card slot to acquire the identification information of the first secure element.

S602. Acquire preset identification information, where the preset identification information is used to identify an exclusive secure element.

S603. Match the identification information of the first secure element with the preset identification information.

Specifically, the terminal matches owner identification information of the first secure element connected to the preset card slot with preset owner identification information of the exclusive secure element. When the owner information is matched, the terminal determines that the first secure element is the exclusive secure element, and in this case, step S604 is performed; and when the owner information is not matched, the first secure element is not the exclusive secure element, and in this case, step S605 is performed.

S604. When the terminal determines that the identification information of the first secure element connected to the preset card slot matches the preset identification information of the exclusive secure element, the terminal connects a control circuit between the NFC controller and the preset card slot, so as to set the first secure element to a normal working state, and disconnects a control circuit between the NFC controller and the other secure element interfaces, so as to set the other secure elements to a non-normal working state.

Specifically, the owner information of the first secure element connected to the preset card slot matches the preset owner information of the exclusive secure element, and the terminal determines that the first secure element is the exclusive secure element. The terminal sets the control switch on the control circuit between the NFC controller and the preset card slot to be in a closed state, that is, the control circuit between the first secure element and the NFC controller is in a connected state. In this case, the terminal may set the first secure element to an enabled state, create a logical channel between the processor of the terminal and the NFC controller of the terminal, where the logical channel is used for communication between the processor and the first secure element, configure routing information of an application installed on the first secure element into a routing table of the NFC controller, and set the first secure element to the normal working state. Meanwhile, the terminal opens the control switch between the NFC controller and the other secure element interfaces, that is, the control circuit between the other secure elements, on the terminal and the NFC controller is in a disconnected state, and in this case, the other secure elements are in the non-normal working state. The terminal may lock a control permission of the control switch to keep the first secure element in the normal working state.

Further, the terminal may further monitor a status of the first secure element connected to the preset card slot. When the hardware is removed from the preset card slot, the terminal may set the control circuit between the preset card slot and the NFC controller to be in a disconnected state, and the terminal may connect the control circuit between the NFC controller and the other secure element interfaces, so as to set the other secure elements to be in the normal working state.

S605. When the terminal determines that the identification information of the first secure element connected to the preset card slot does not match the preset identification information of the exclusive secure element, the terminal connects a control circuit between the NFC controller and all secure element interfaces, so as to set secure elements connected to all the secure element interfaces to the normal working state.

Specifically, when owner information of a secure element supported by the hardware on the preset card slot does not match the preset owner information of the exclusive secure element, and the hardware secure element on the special card slot is not the exclusive secure element, the processor sends a control signal to the control circuit to close the connection control switch between the NFC controller and the other secure elements. In this case, the terminal connects a switch circuit between the NFC controller and the preset card slot, and connects a switch circuit between the NFC controller and the other secure elements; and there is no exclusive secure element on the terminal, all the secure elements are in an equal connection status, and each secure element is in the normal working state.

Software Module Apparatus Embodiment Part

Figure 14:
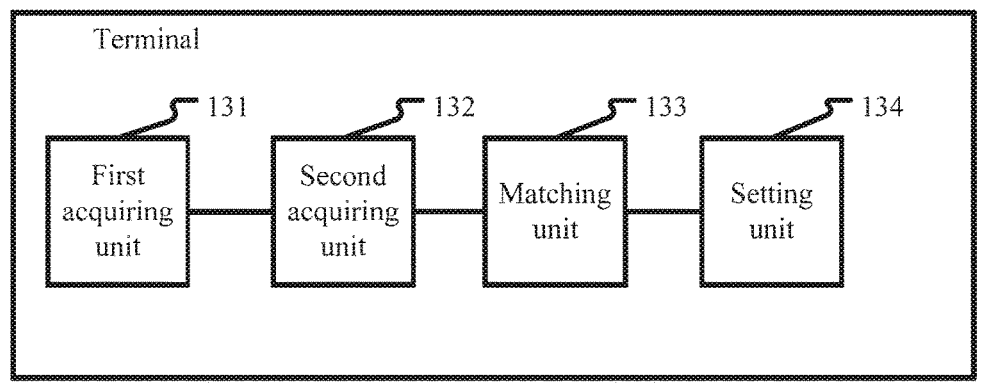
FIG. 14 is a schematic structural diagram of an embodiment of a terminal according to an embodiment of the present disclosure.

An embodiment of the present disclosure provides a terminal. As shown in FIG. 14, the terminal includes: a first acquiring unit 131, a second acquiring unit 132, a matching unit 133, and a setting unit 134.

The first acquiring unit 131 is configured to, when a first secure element is connected to secure element interfaces, acquire identification information of the connected first secure element. Specifically, the terminal may include at least two secure element interfaces. After the first secure element is connected to the secure element interface, the first acquiring unit 131 acquires the identification information of the first secure element. Optionally, the identification information of the first secure element may be owner identification information of the first secure element, where the owner identification information is used to identify an issuer of the secure element. Optionally, after acquiring the identification information of the first secure element, the first acquiring unit 131 may further acquire identification information of other secure elements connected to the terminal, where the other secure elements are secure elements connected to the secure element interfaces.

The second acquiring unit 132 is configured to acquire preset identification information, where the preset identification information is used to identify an exclusive secure element. Specifically, identification information of the exclusive secure element is preset in the terminal, and a secure element corresponding to the preset identification information of the exclusive secure element is the exclusive secure element. The second acquiring unit 132 acquires the preset identification information, where the preset identification information may be preset owner identification information of the exclusive secure element, and may further include operator identification information.

The matching unit 133 is configured to match the identification information of the first secure element with the preset identification information, Specifically, after the first acquiring unit 131 acquires the identification information of the first secure element, and the second acquiring unit 132 acquires the preset identification information, the matching unit 133 matches the identification information of the first secure element with the preset identification information of the exclusive secure element, and further determines whether the first secure element is the exclusive secure element.

Optionally, the performing, by the matching unit 133, matching between the identification information of the first secure element and the preset identification information of the exclusive secure element may be matching the owner identification information of the first secure element with the preset owner identification information of the exclusive secure element.

Optionally, when the first secure element is a UICC-type secure element, the preset identification information includes operator identification information and the owner identification information. That the matching unit 133 matches the identification information of the first secure element with the preset identification information includes that: the matching unit 133 matches operator identification information of the UICC-type secure element with the preset operator identification inform-nation and the matching unit 133 matches owner identification information of the UICC-type secure element with the preset owner identification information when the operator identification information of the UICC-type secure element matches the preset operator identification information.

The setting unit 134 is configured to, when the identification information of the first secure element matches the preset identification information, set the first secure element to a normal working state, and set the other connected secure elements on the terminal to a non-normal working state, where the other secure elements are secure elements connected to the secure element interfaces.

When the identification information of the first secure element matches the preset identification information of the exclusive secure element, the terminal determines that the first secure element is the exclusive secure element. Based on a feature of the exclusive secure element, the setting unit 134 sets the first secure element to the normal working state, and sets the other secure elements to the non-normal working state. Specifically, for setting secure elements to be in the normal working state and the non-normal working state, reference may be made to a corresponding part of the hardware module apparatus embodiment part, and details are not described in this part again.

In this embodiment of the present disclosure, when a first secure element is connected to secure element interfaces, a terminal acquires identification information of the connected first secure element; acquires preset identification information, where the preset identification information is used to identify an exclusive secure element; matches the identification information of the first secure element with the preset identification information; and when the identification information of the first secure element matches the preset identification information, sets the first secure element to a normal working state, and sets other connected secure elements on the terminal to a non-normal working state. According to this embodiment of the present disclosure, the terminal supports a management mode of an exclusive secure element, a requirement of an exclusive secure element issuer for exclusively taking control of a secure element of the terminal is met, and payment efficiency of mobile payment is improved.

In an implementation manner of this embodiment of the present disclosure, the setting unit is further configured to: set both the first secure element and the other secure elements to the normal working state when the identification information of the first secure element does not match the preset identification information and identification information of the other secure elements does not match the preset identification information. In this implementation manner of this embodiment of the present disclosure, none of secure elements connected to the secure element interfaces is the exclusive secure element, all the secure elements are in an equal status, and the terminal supports collaborative working of multiple secure elements, and may be compatible with secure elements of multiple parties such as a mobile communications operator, a financial institution, a third-party mobile payment operator, which improves support efficiency of mobile payment.

Figure 15:
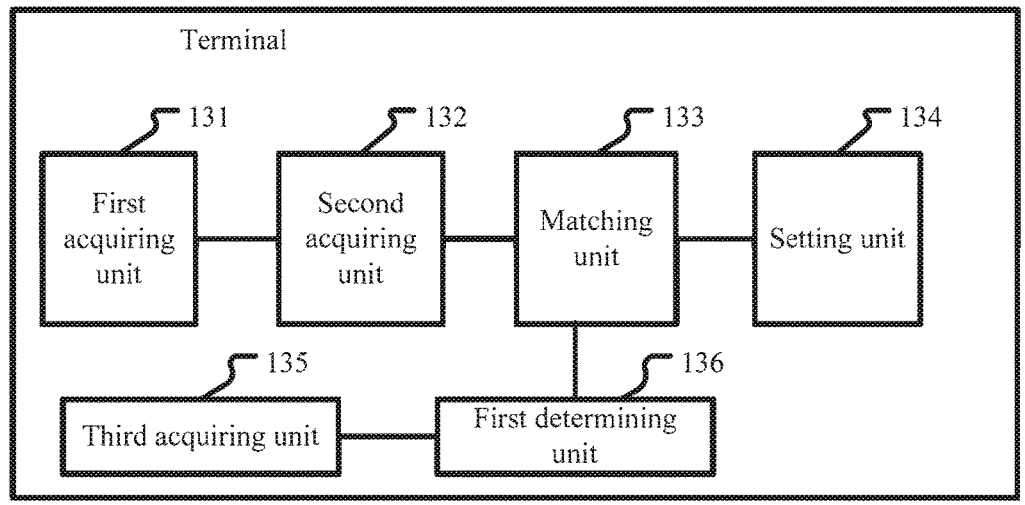
FIG. 15 is a schematic structural diagram of an embodiment of a terminal according to an embodiment of the present disclosure.

In an implementation manner of this embodiment of the present disclosure, as shown in FIG. 15, the terminal further includes: a third acquiring unit 135, configured to acquire identification information of the other connected secure elements; and a first determining unit 136, configured to match the identification information of the other secure elements with the preset identification information, and determine that the identification information of the other secure elements does not match the preset identification information. Specifically, the third acquiring unit 135 may acquire the identification information of the other secure elements one by one, and the first determining unit 136 matches the identification information of the other secure elements that is acquired with the preset identification information one by one, and determines that the identification information of the other secure elements does not match the preset identification information.

Figure 16:
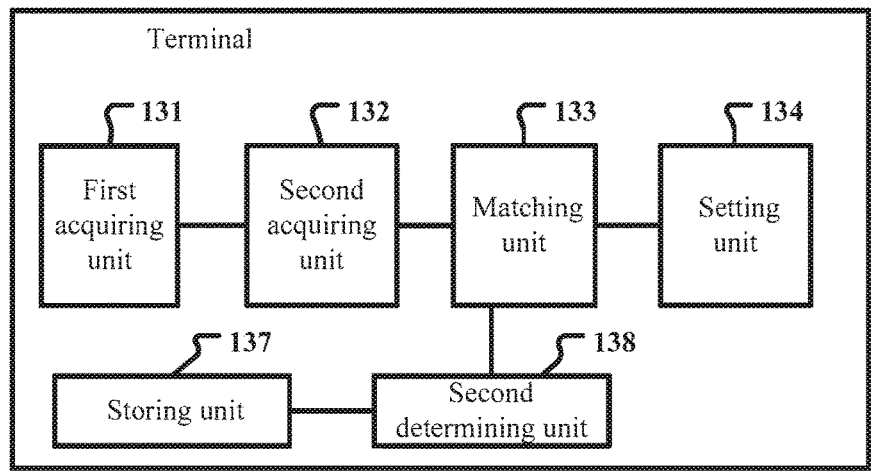
FIG. 16 is a schematic structural diagram of an embodiment of a terminal according to an embodiment of the present disclosure.

In an implementation manner of this embodiment of the present disclosure, as shown in FIG. 16, the terminal further includes: a storing unit 137, configured to store information about matching between identification information of secure elements connected to the secure element interfaces and the preset identification information; and a second determining unit 138, configured to acquire the information about matching between identification information of secure elements connected to the secure element interfaces and the preset identification information, and determine that the identification information of the other secure elements does not match the preset identification information. Before the first secure element is connected to the terminal, the storing unit 137 has stored a result of matching between the identification information of the other connected secure elements and the preset identification information; and after the first secure element is connected, the second determining unit 138 invokes the result of the matching, and determines that the identification information of the other secure elements does not match the preset identification information.

In an implementation manner of this embodiment of the present disclosure, the identification information includes owner identification information, where the owner identification information is used to identify a secure element issuer. For example, the identification information, acquired by the first acquiring unit, of the first secure element may be owner identification information of the first secure element, where the owner identification information is used to identify an issuer of the first secure element; and the preset identification information acquired by the second acquiring unit may include owner identification information, where the owner identification information may be used to identify an issuer of the exclusive secure element.

Figure 17:
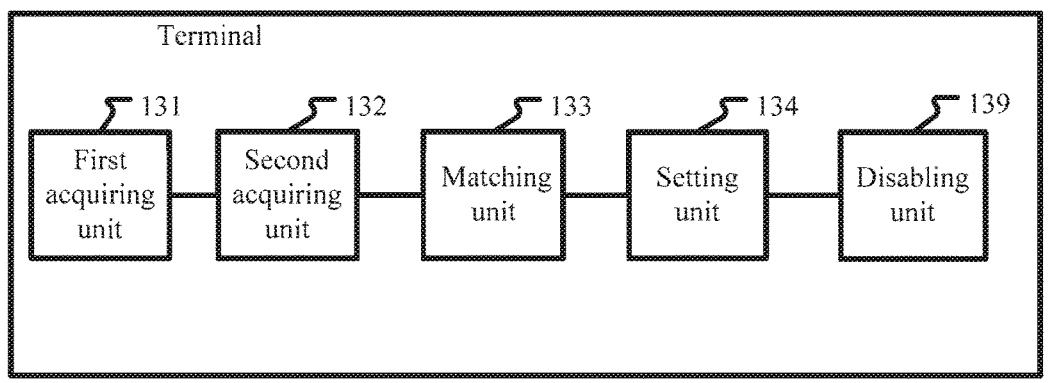
FIG. 17 is a schematic structural diagram of an embodiment of a terminal according to an embodiment of the present disclosure.

In an implementation manner of this embodiment of the present disclosure, as shown in FIG. 17, the terminal further includes: a disabling unit 139, configured to, before the first acquiring unit acquires the identification information of the connected first secure element, when the terminal detects that a quantity of secure elements connected to the at least two secure element interfaces changes, disable NFC applications installed on all secure elements connected to the secure element interfaces.

In an implementation manner of this embodiment of the present disclosure, that the setting unit sets the first secure element to a normal working state includes that: the setting unit is configured to: set the first secure element to an enabled state; create a logical channel between a processor of the terminal and an NFC controller of the terminal, where the logical channel is used for communication between the processor and the first secure element; and configure routing information of an application installed on the first secure element into a routing table of the NFC controller.

Figure 18:
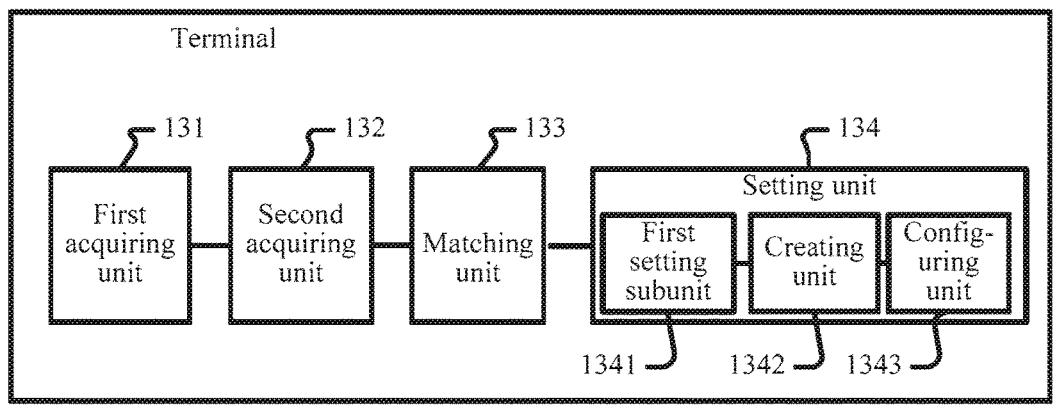
FIG. 18 is a schematic structural diagram of an embodiment of a terminal according to an embodiment of the present disclosure.

It should be noted that, in this implementation manner, the setting, by the setting unit, the first secure element to the normal working state may be that the setting unit, as an independent apparatus, performs the foregoing specific steps, or may be that specific subunits in the setting unit performs the steps. As shown in FIG. 18, the setting unit may include: a first setting subunit 1341, configured to set the first secure element to the enabled state; a creating unit 1342, configured to create the logical channel between the processor of the terminal and the NFC controller of the terminal, where the logical channel is used for communication between the processor and the first secure element; and a configuring unit 1343, configured to configure the routing information of the application installed on the first secure element into the routing table of the NFC controller.

In an embodiment of the present disclosure, the first secure element may be a secure element in a broad sense, for example, a terminal that supports android 4.4 host-based card emulation, that is, a host-based card emulation function. The terminal may be considered as the first secure element, and in this case, an application installed on the first secure element is an application installed on the terminal. The setting, by the setting unit, the first secure element to the normal working state includes: setting the first secure element to an enabled state; configuring the routing information of the application installed on the first secure element into the routing table of the NFC controller; and configuring the routing information of the application installed on the first secure element into a routing table maintained by the processor. The processor maintains routing information of all applications that have been installed on the terminal; optionally, the routing information of all the installed application is stored on the terminal in a form of a routing table. The routing information stores an application identifier of an application installed on the terminal, where the application identifier is used to identify path information, and the path information may be information about a path, in which the application is installed, on the terminal. The terminal may also serve as other secure elements besides the first secure element.

In an implementation manner of this embodiment of the present disclosure, the setting, by the setting unit, the other secure elements connected to the terminal to the non-normal working state includes at least one of the following setting manners: setting the other secure elements to a disabled state; setting a control switch on a control circuit that connects the other secure elements and the NFC controller to an open state; and deleting routing information, stored in the routing table of the NFC controller, of applications installed on the other secure elements.

Figure 19:
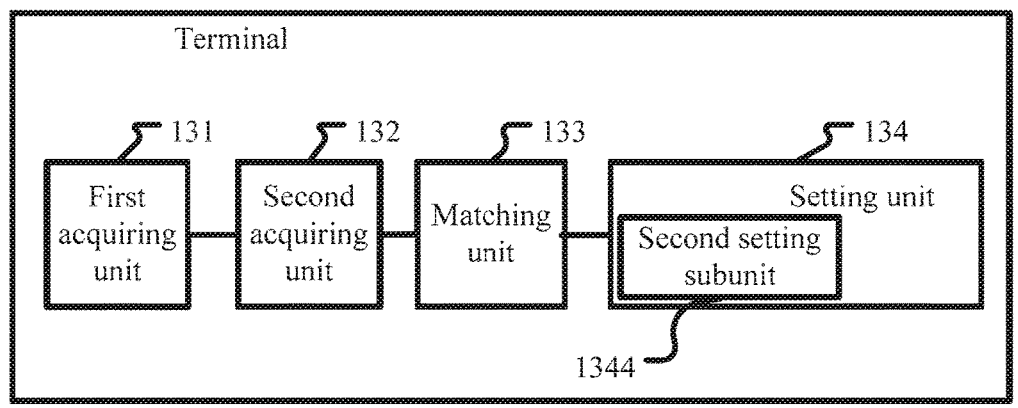
FIG. 19 is a schematic structural diagram of an embodiment of a terminal according to an embodiment of the present disclosure.
Figure 20:
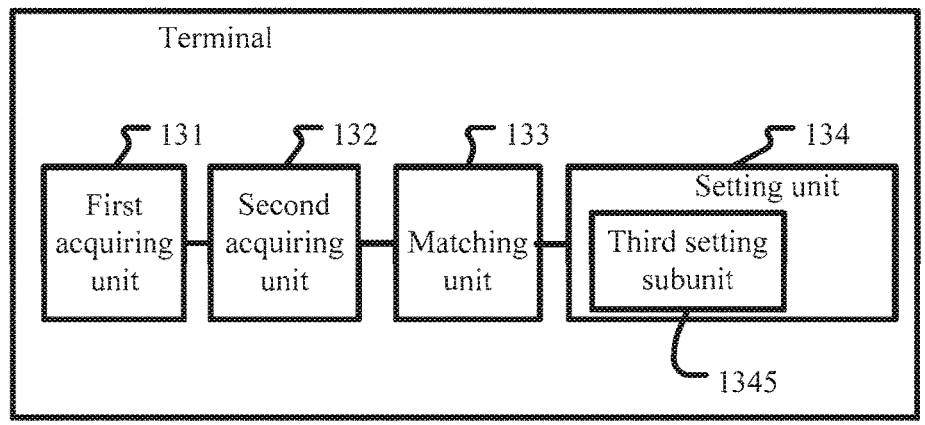
FIG. 20 is a schematic structural diagram of an embodiment of a terminal according to an embodiment of the present disclosure.
Figure 21:
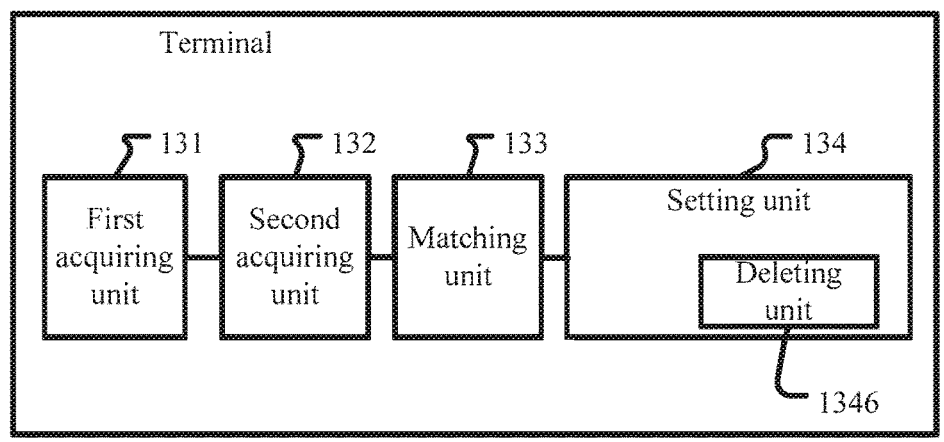
FIG. 21 is a schematic structural diagram of an embodiment of a terminal according to an embodiment of the present disclosure.
Figure 22:
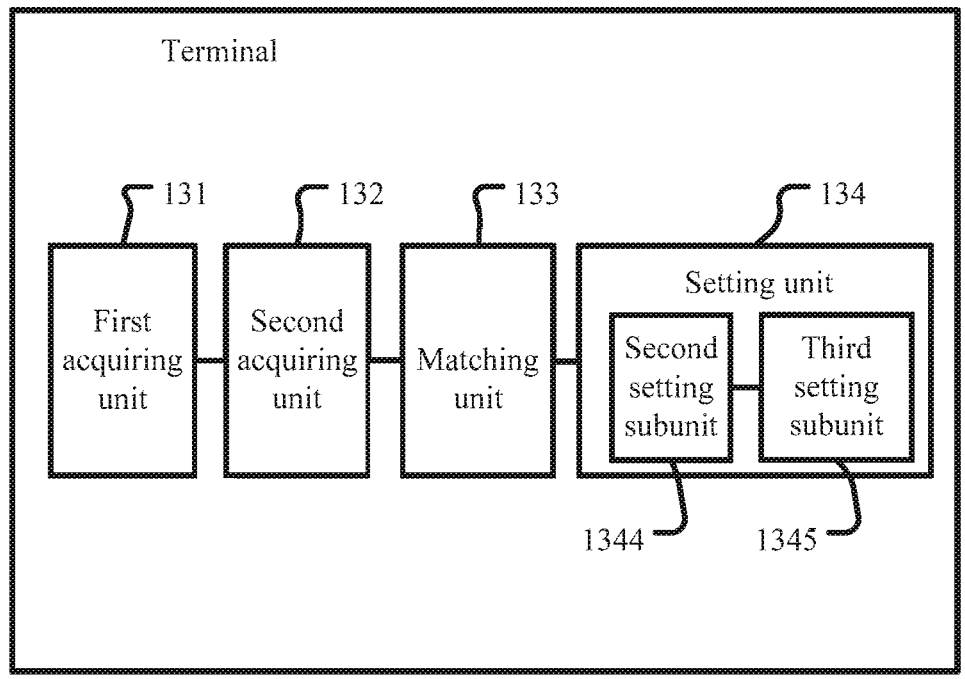
FIG. 22 is a schematic structural diagram of an embodiment of a terminal according to an embodiment of the present disclosure.
Figure 23:
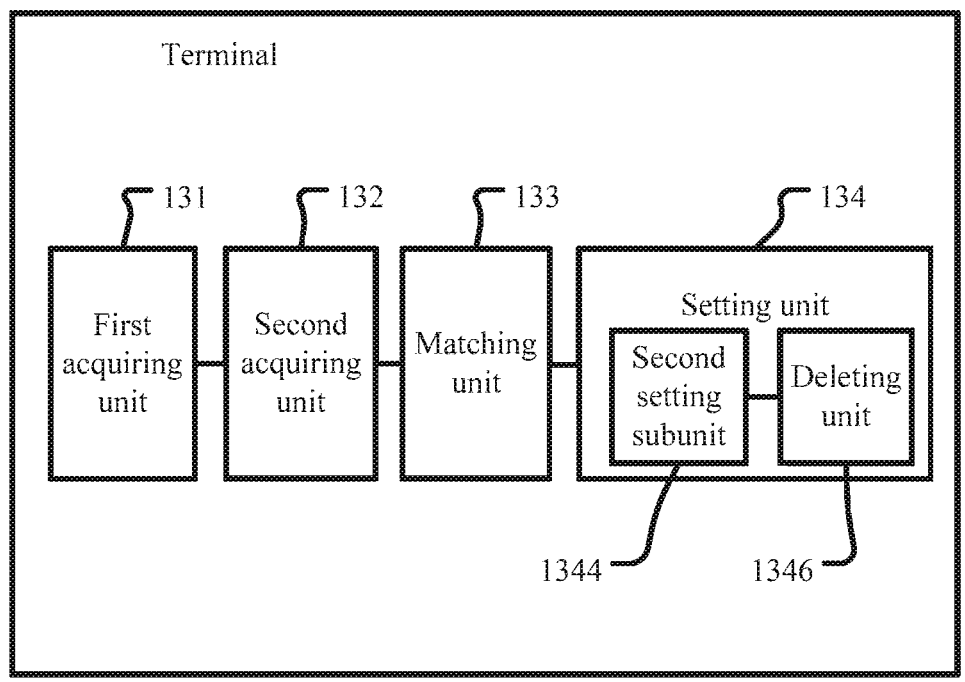
FIG. 23 is a schematic structural diagram of an embodiment of a terminal according to an embodiment of the present disclosure.
Figure 24:
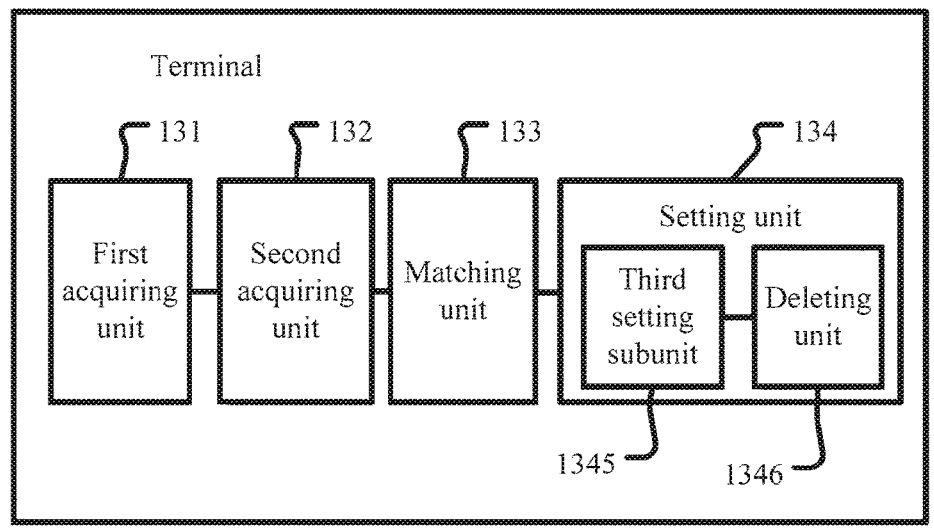
FIG. 24 is a schematic structural diagram of an embodiment of a terminal according to an embodiment of the present disclosure.
Figure 25:
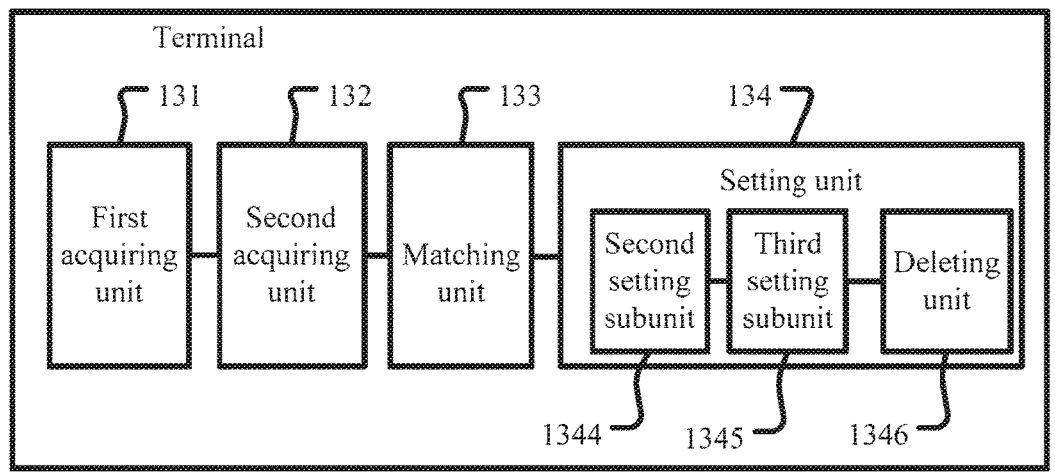
FIG. 25 is a schematic structural diagram of an embodiment of a terminal according to an embodiment of the present disclosure.

It should be noted that, in this implementation manner, the setting, by the setting unit, the other secure elements connected to the terminal to the non-normal working state may be that the setting unit, as an independent apparatus, performs the foregoing specific steps, or may be that specific subunits in the setting unit performs the steps. The setting unit may include at least one of the following subunits: a second setting subunit, configured to set the other secure elements to the disabled state; a third setting subunit, configured to set the control switch on the control circuit that connects the other secure elements and the NFC controller to the open state; and a deleting unit, configured to delete the routing information, stored in the routing table of the NFC controller, of the applications installed on the other secure elements. When the terminal includes two or more of: the second setting subunit, the third setting subunit, and the deleting unit, the subunits included in the setting unit may be connected to each other. As shown in FIG. 19, when the setting unit includes only the second setting subunit 1344, the second setting subunit 1344 sets the other secure elements to the disabled state, and further sets the other secure elements to the non-normal working state. As shown in FIG. 20, when the setting unit includes only the third setting subunit 1345, the third setting subunit sets the control switch on the control circuit that connects the other secure elements and the NFC controller to the open state, the NFC controller cannot create a logical channel with the processor of the terminal, so that the other secure elements are in the non-normal working state. As shown in FIG. 21, when the setting unit includes only the deleting unit 1346, the deleting unit 1346 deletes the routing information, stored in the routing table of the NFC controller, of the applications installed on the other secure elements, so that the other secure elements are in the non-normal working state. As shown in FIG. 22, the setting unit may further include both the second setting subunit 1344 and the third setting subunit 1345, where the second setting subunit 1344 is connected to the third setting subunit 1345. As shown in FIG. 23, the setting unit may further include both the second setting subunit 1344 and the deleting unit 1346, where the second setting subunit 1344 is connected to the deleting unit 1346. As shown in FIG. 24, the setting unit may further include both the third setting subunit 1345 and the deleting unit 1346, where the third setting subunit 1345 is connected to the deleting unit 1346. As shown in FIG. 25, the setting unit may further include the second setting subunit 1344, the third setting subunit 1345, and the deleting unit 1346, where the second setting subunit 1344 is connected to the third setting subunit 1345, and the third setting subunit 1345 is connected to the deleting unit 1346.

Figure 26:
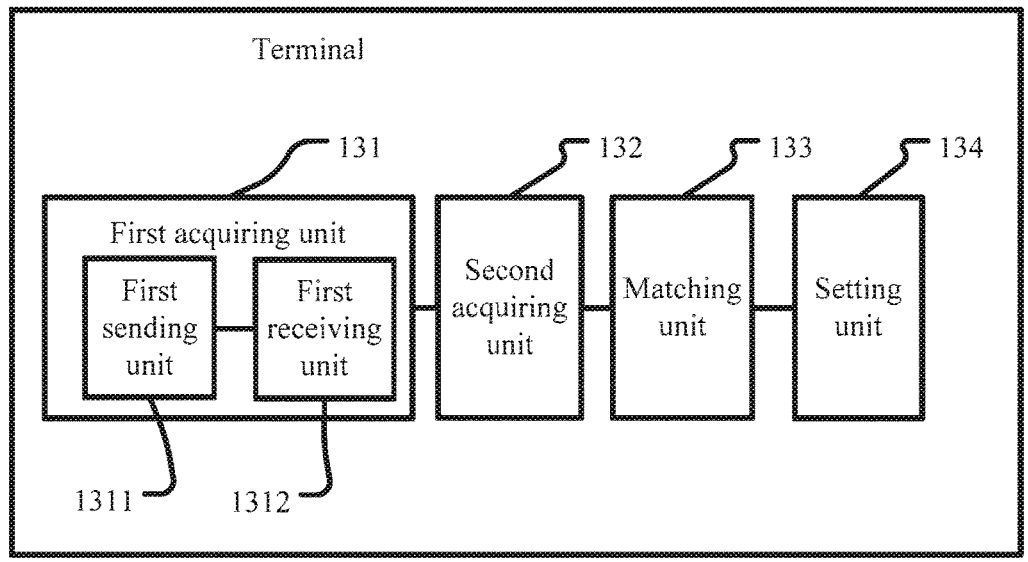
FIG. 26 is a schematic structural diagram of an embodiment of a terminal according to an embodiment of the present disclosure.

In an implementation manner of this embodiment of the present disclosure, as shown in FIG. 26, the first acquiring unit includes: a first sending unit 1311, configured to send a query message to the first secure element, where the query message is used to query the identification information of the first secure element; a first receiving unit 1312, configured to receive an answer message sent by the first secure element, where the answer message includes the identification information of the first secure element.

Figure 27:
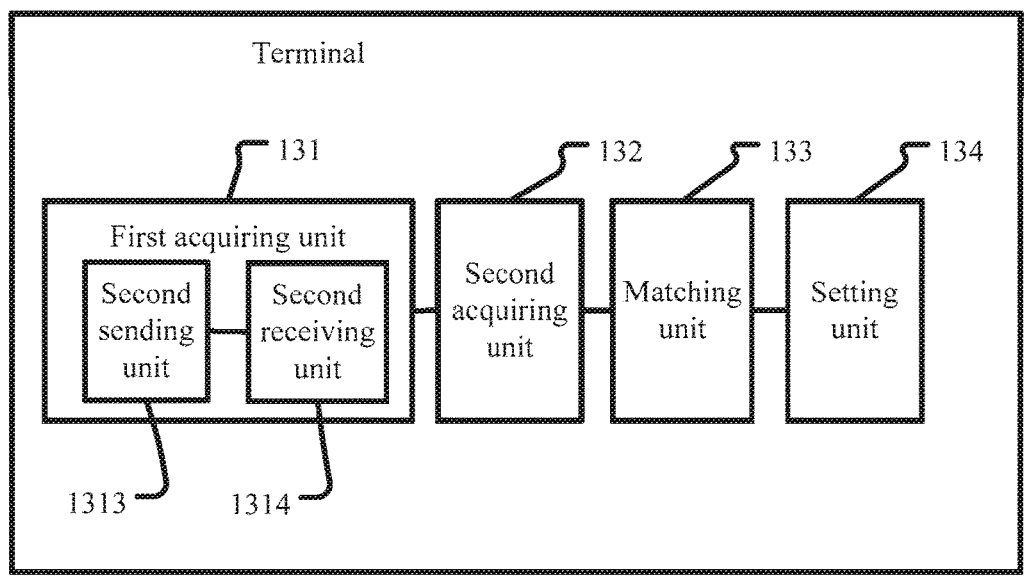
FIG. 27 is a schematic structural diagram of an embodiment of a terminal according to an embodiment of the present disclosure.

In an implementation manner of this embodiment of the present disclosure, as shown in FIG. 27, the first acquiring unit includes: a second sending unit 1313, configured to send a query message to the NFC controller, where the query message is used to query the identification information of the first secure element connected to the NFC controller; and a second receiving unit 1314, configured to receive an answer message sent by the NFC controller, where the answer message includes the identification information of the first secure element.

Figure 28:
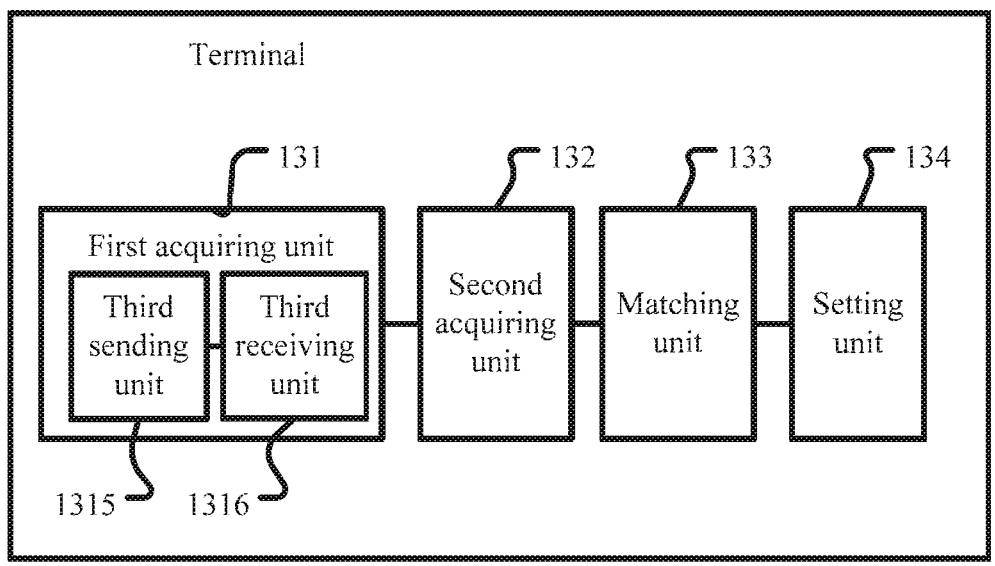
FIG. 28 is a schematic structural diagram of an embodiment of a terminal according to an embodiment of the present disclosure.

In an implementation manner of this embodiment of the present disclosure, as shown in FIG. 28, the secure element interfaces of the terminal include a UICC secure element interface, where the UICC secure element interface is configured to connect to a UICC-type secure element. The first acquiring unit includes: a third sending unit 1315, configured to send a query request to a server, where the query request is used to query identification information of the UICC-type secure element; and a third receiving unit 1316, configured to receive an answer message sent by the server, where the answer message includes the identification information of the UICC-type secure element. Further, the preset identification information includes operator identification information and the owner identification information; and that the matching unit matches the identification information of the first secure element with the preset identification information includes that: the matching unit matches operator identification information of the UICC-type secure element with the preset operator identification information.

In an implementation manner of this embodiment of the present disclosure, the secure element interfaces include a UICC secure element interface, where the UICC secure element interface is configured to connect to a UICC-type secure element; and that the first acquiring unit acquires the identification information of the first secure element includes: the first acquiring unit receives an ATR message sent by a UICC, and acquires identification information of the UICC-type secure element. Further, the preset identification information includes operator identification information and the owner identification information; and that the matching unit matches the identification information of the first secure element with the preset identification information includes that: the matching unit matches operator identification information of the UICC-type secure element with the preset operator identification information.

In an implementation manner of this embodiment of the present disclosure, the setting unit is further configured to set the other secure elements to the normal working state when the identification information of the first secure element matches the preset identification information and the first secure element is removed.

What is claimed is:
1. A terminal, comprising:
a processing circuit; and
at least two secure element interfaces, wherein
the processing circuit is connected to the at least two secure element interfaces, and
the processing circuit is configured to:
acquire identification information of a first secure element when the first secure element is connected to the secure element interfaces;
acquire preset identification information, wherein the preset identification information is used to identify an exclusive secure element that, when being connected to the terminal, is configured to operate while excluding any other secure element connected to the terminal from being accessed by an external device;
determine whether the identification information of the first secure element matches the preset identification information; and
in response to a determination that the identification information of the first secure element matches the preset identification information, set the first secure element to a normal working state, and set one or more other secure elements connected to the terminal to a non-normal working state, wherein, when setting the first secure element to the normal working state, the processing circuit is configured to:
send an instruction to a near field communication (NFC) controller;
set the first secure element to an enabled state;
create a logical channel between the processing circuit and the NFC controller, wherein the logical channel is used for communication between the processing circuit and the first secure element; and
configure routing information of an application installed on the first secure element into a routing table of the NFC controller,
wherein the processing circuit is further configured to set the first secure element and the one or more other secure elements to the normal working state when the identification information of the first secure element does not match the preset identification information and identification information of the one or more other secure elements does not match the preset identification information.

2. The terminal according to claim 1, wherein the identification information acquired by the processing circuit comprises owner identification information that is used to identify a secure element issuer.

3. The terminal according to claim 1, wherein, when the identification information of the first secure element matches the preset identification information, the processing circuit is further configured to configure the routing information of the application installed on the first secure element into a routing table maintained by the processing circuit.

4. The terminal according to claim 1, further comprising a control circuit and the NFC controller, wherein
the control circuit is connected to the processing circuit,
the control circuit is connected to the NFC controller,
the control circuit is connected to the secure element interfaces,
a control switch is disposed on the control circuit, a first end of the control switch being connected to one of the secure element interfaces that receives one of the one or more other secure elements, and a second end of the control switch is connected to the NFC controller; and
the processing circuit is further configured to send a control signal to the control circuit to set the control switch to an open state when the identification information of the first secure element matches the preset identification information.

5. The terminal according to claim 1, wherein the processing circuit is further configured to set the one or more other secure elements to the normal working state when the identification information of the first secure element matches the preset identification information and the first secure element is removed from the terminal.

6. A method for secure element management of a terminal that comprises at least two secure element interfaces, wherein the method comprises:
acquiring identification information of a first secure element when the first secure element is connected to the secure element interfaces;
acquiring preset identification information, wherein the preset identification information is used to identify an exclusive secure element that, when being connected to the terminal, is configured to operate while excluding any other secure element connected to the terminal from being accessed by an external device;
determining, by a processor of the terminal, whether the identification information of the first secure element matches the preset identification information; and
in response to a determination that the identification information of the first secure element matches the preset identification information, setting, by the processor of the terminal, the first secure element to a normal working state, and setting one or more other secure elements connected to the terminal to a non-normal working state,
wherein, when setting the first secure element to the normal working state, the method further comprises:
sending an instruction to a near field communication (NFC) controller;
setting the first secure element to an enabled state;
creating a logical channel between the processing circuit and the NFC controller, wherein the logical channel is used for communication between the processing circuit and the first secure element; and
configuring routing information of an application installed on the first secure element into a routing table of the NFC controller,
wherein the method further comprises setting the first secure element and the one or more other secure elements to the normal working state when the identification information of the first secure element does not match the preset identification information and identification information of the one or more other secure elements does not match the preset identification information.

7. The method according to claim 6, wherein the identification information comprises owner identification information that is used to identify a secure element issuer.

8. The method according to claim 6, wherein the method further comprises:
when the identification information of the first secure element matches the preset identification information, configuring the routing information of the application installed on the first secure element into a routing table maintained by the processor.

9. The method according to claim 6, wherein the setting the one or more other connected secure elements connected to the terminal to the non-normal working state comprises one or more of:
setting the one or more other secure elements to a disabled state;
setting a control switch on a control circuit that connects one of the secure element interfaces that receives one of the one or more other secure elements and the NFC controller to an open state; or
deleting, from a routing table of the NFC controller, routing information of an application installed on the one or more other secure elements.

10. The method according to claim 6, wherein the method further comprises:
setting the one or more other secure elements to the normal working state when the identification information of the first secure element matches the preset identification information and the first secure element is removed from the terminal.

11. A terminal comprising:
processing circuitry configured to:
acquire identification information of a first secure element when the first secure element is connected to a secure element interfaces;
acquire preset identification information, wherein the preset identification information is used to identify an exclusive secure element that, when being connected to the terminal, is configured to operate while excluding any other secure element connected to the terminal from being accessed by an external device;

determine whether the identification information of the first secure element matches the preset identification information; and in response to a determination that the identification information of the first secure element matches the preset identification information, set the first secure element to a normal working state, and set one or more other secure elements connected to the terminal to a non-normal working state, wherein, when setting the first secure element to the normal working state, the processing circuitry is further configured to:

send an instruction to a near field communication (NFC) controller;

set the first secure element to an enabled state;

create a logical channel between the processing circuit and the NFC controller, wherein the logical channel is used for communication between the processing circuit and the first secure element; and configure routing information of an application installed on the first secure element into a routing table of the NFC controller, wherein the processing circuitry is further configured to set the first secure element and the one or more other secure elements to the normal working state when the identification information of the first secure element does not match the preset identification information and identification information of the one or more other secure elements does not match the preset identification information.

12. The terminal according to claim 11, wherein the processing circuitry is further configured to:

when the identification information of the first secure element matches the preset identification information, configure the routing information of the application installed on the first secure element into a routing table maintained by the processor.

13. The terminal according to claim 11, wherein the processing circuitry is further configured to perform one or more of:

setting the one or more other secure elements to a disabled state;

setting a control switch on a control circuit that connects one of the secure element interfaces that receives one of the one or more other secure elements and the NFC controller to an open state; or deleting, from a routing table of the NFC controller, routing information of an application installed on the one or more other secure elements.

14. The terminal according to claim 11, wherein the processing circuitry is further configured to:

set the one or more other secure elements to the normal working state when the identification information of the first secure element matches the preset identification information and the first secure element is removed.

\* \* \* \* \*

UNITED STATES PATENT AND TRADEMARK OFFICE
CERTIFICATE OF CORRECTION

PATENT NO. : 10,397,276 B2
APPLICATION NO. : 15/129715
DATED : August 27, 2019
INVENTOR(S) : Guoqing Li et al.

It is certified that error appears in the above-identified patent and that said Letters Patent is hereby corrected as shown below:

In the Drawings

In sheet 5 of 16, FIG. 9, reference numeral S201, Line 3, delete "conncctcd" and insert -- connected --, In sheet 5 of 16, FIG. 9, reference numeral S201, Line 3, delete "sccurc clcmcnt" and insert
-- secure element --, In the Specification Column 16, Line 67, delete "ID)" and insert -- ID --, Column 20, Line 8, delete "NEC" and insert -- NFC --, Column 29, Line 13, delete "f-r setting" and insert -- for setting --, Column 32, Line 51, delete "FCSD)" and insert -- FCSD --, Column 33, Line 6, delete "PAMID)" and insert -- PAMID --, Column 35, Line 22, delete "NFCEE_SE T_" and insert -- NFCEE_SET_ --, Column 36, Line 28, delete "ID))" and insert -- ID) --, Column 39, Line 54, delete "Unicorn," and insert -- Unicom, --, Column 40, Line 34, delete "7816-4)." and insert -- 7816-4. --, Column 45, Line 64, delete "information," and insert -- information. --, Column 46, Line 21, delete "inform-nation" and insert -- information; --.

Signed and Sealed this
Fifth Day of May, 2020

Andrei Iancu
*Director of the United States Patent and Trademark Office*